US 11,212,800 B2

(12) United States Patent
Yoo et al.

(10) Patent No.: US 11,212,800 B2
(45) Date of Patent: Dec. 28, 2021

(54) METHOD AND APPARATUS FOR COMMUNICATION IN WIRELESS COMMUNICATION SYSTEM

(71) Applicant: Samsung Electronics Co., Ltd., Suwon-si (KR)

(72) Inventors: Hyunil Yoo, Suwon-si (KR); Young Han Nam, Richardson, TX (US); Taeyoung Kim, Seoul (KR); Jeehwan Noh, Suwon-si (KR); Keonkook Lee, Suwon-si (KR); Suryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/574,594

(22) Filed: Sep. 18, 2019

(65) Prior Publication Data

US 2020/0077398 A1 Mar. 5, 2020

Related U.S. Application Data

(63) Continuation of application No. 15/235,841, filed on Aug. 12, 2016.

(Continued)

(51) Int. Cl.
*H04W 72/04* (2009.01)
*H04L 5/14* (2006.01)
(Continued)

(52) U.S. Cl.
CPC ....... *H04W 72/0453* (2013.01); *H04L 5/0051* (2013.01); *H04L 5/0094* (2013.01);
(Continued)

(58) Field of Classification Search
CPC ............ H04W 72/0453; H04L 5/1469; H04L 5/0051; H04L 5/0012; H04L 5/0094; H04L 5/0037; H04L 27/2613
See application file for complete search history.

(56) References Cited

U.S. PATENT DOCUMENTS 8,320,267 B2   11/2012   Wei et al.
8,976,747 B2   3/2015    Tseng
(Continued)

FOREIGN PATENT DOCUMENTS

CN   102098148 A   6/2011
CN   102196570 A   9/2011
(Continued)

OTHER PUBLICATIONS

European Extended Search Report dated Jul. 13, 2018, issued in the European Patent Office, in connection with a counterpart of European application No. 16835497.5-1219/3335363.
(Continued)

*Primary Examiner* — Rasheed Gidado
(74) *Attorney, Agent, or Firm* — Jefferson IP Law, LLP

(57) ABSTRACT

The present disclosure relates to a 5G or pre-5G communication system for supporting a data rate higher than that of the 4G system. A method by a terminal in a wireless communication system according to the present disclosure includes receiving a first message comprising first information indicating a number of symbols in an uplink pilot time slot (UpPTS) region, identifying at least one symbol for transmitting a sounding reference signal (SRS) based on the first information, and transmitting the SRS.

8 Claims, 21 Drawing Sheets

Related U.S. Application Data

(60) Provisional application No. 62/204,686, filed on Aug. 13, 2015, provisional application No. 62/232,077, filed on Sep. 24, 2015, provisional application No. 62/250,239, filed on Nov. 3, 2015, provisional application No. 62/250,304, filed on Nov. 3, 2015.

(51) Int. Cl.
*H04L 27/26* (2006.01)
*H04L 5/00* (2006.01)

(52) U.S. Cl.
CPC ........ *H04L 5/1469* (2013.01); *H04L 27/2613* (2013.01); *H04L 5/0012* (2013.01); *H04L 5/0037* (2013.01)

(56) References Cited

U.S. PATENT DOCUMENTS

| | | | |
|---|---|---|---|
| 9,143,299 | B2 | 9/2015 | Seo et al. |
| 9,749,968 | B2 | 8/2017 | Stern-Berkowitz et al. |
| 9,935,751 | B2* | 4/2018 | Kim ................ H04L 5/001 |
| 2010/0080139 | A1 | 4/2010 | Palanki et al. |
| 2011/0098054 | A1* | 4/2011 | Gorokhov ........... H04L 5/0035 455/452.1 |
| 2011/0170496 | A1 | 7/2011 | Fong et al. |
| 2011/0310818 | A1* | 12/2011 | Lin ................ H04L 5/0048 370/329 |
| 2012/0052899 | A1 | 3/2012 | Wang et al. |
| 2012/0106489 | A1 | 5/2012 | Konishi et al. |
| 2012/0287900 | A1 | 11/2012 | Seo et al. |
| 2013/0016705 | A1 | 1/2013 | Zhang et al. |
| 2013/0039233 | A1 | 2/2013 | Dai et al. |
| 2013/0148592 | A1 | 6/2013 | Noh et al. |
| 2013/0182618 | A1 | 7/2013 | Chen et al. |
| 2014/0036859 | A1* | 2/2014 | Ekpenyong ....... H04W 72/1231 370/330 |
| 2014/0219232 | A1* | 8/2014 | Takeda ................ H04W 16/32 370/329 |
| 2015/0003305 | A1* | 1/2015 | Park ................ H04L 5/0048 370/280 |
| 2015/0078222 | A1 | 3/2015 | Yang et al. |
| 2015/0085715 | A1 | 3/2015 | Sun et al. |
| 2015/0110023 | A1 | 4/2015 | Pan et al. |
| 2015/0327263 | A1* | 11/2015 | Chen ................ H04W 16/14 370/280 |
| 2016/0043842 | A1 | 2/2016 | Gong et al. |
| 2016/0192356 | A1* | 6/2016 | Lee ................. H04W 52/325 370/280 |
| 2016/0295575 | A1* | 10/2016 | Dinan ................ H04L 1/1864 |
| 2017/0150499 | A1* | 5/2017 | Kim ................ H04L 27/2613 |

FOREIGN PATENT DOCUMENTS

| | | |
|---|---|---|
| EP | 3 282 663 A1 | 2/2018 |
| GN | 101931456 A | 12/2010 |
| WO | 2010/053984 A2 | 5/2010 |
| WO | 2013/010030 A1 | 1/2013 |
| WO | 2013/139245 A1 | 9/2013 |
| WO | 2014/019213 A1 | 2/2014 |

OTHER PUBLICATIONS

Samsung: "Additional special subframe configuration for LTE TDD", 3GPP Draft; R1-121651, 3rd Generation Partnership Project (3GPP), Mobile Competence Centre ; 650, Route Des Lucioles ; F-06921 Sophia-Anti Polis Cedex, XP050599914; Mar. 26, 2012, France.

Huawei et al.: "Discussion on SRS enhancements for EBF/FD-MIMO", 3GPP Draft; R1-150056, 3rd Generation Partnership Project (3GPP), Mobile Competence Centre ; 650, Route Des Lucioles ; F-06921 Sophia-Anti Polis Cedex, XP050933273; Feb. 19, 2015, Franc.

ZTE: "Discussion on SRS capacity improvement", 3GPP Draft; R1-155265 Discussion On SRS Capacity Improvement, 3rd Generation Partnership Project (3GPP), Mobile Competence Centre ; 650, Route Des Lucioles ; F-06921 Sophia-Antipolis Cedex ; France, vol. RAN WG1, No. Malmö, Sweden Oct. 5, 2015-Oct. 9, 2015 Oct. 4, 2015, XP051002224.

CMCC: "Details on SRS capacity improvement", 3GPP Draft; R1-155791,3RD Generation Partnership Project (3GPP), Mobile Compei Ence Centre ; 650, Route Des Lucioles ; F-06921 Sophia-Antipolis Cedex ; FRANCE, vol. Ran WG1, No. Malmo, Sweden; 20151005 - 20151009 Oct. 4, 2015, XP05 1002597.

European Office Action dated Sep. 11, 2019, issued in European Application No. 16835497.5.

Chinese Office Action dated Jun. 29, 2020, issued in Chinese Application No. 201680047832.6.

Indian Office Action dated Dec. 28, 2020, issued in Indian Application No. 201817000009.

* cited by examiner

FIG. 3

| Special subframe configuration | Normal cyclic prefix in downlink | | | | Extended cyclic prefix in downlink | | |
|---|---|---|---|---|---|---|---|
| | | | UpPTS | | | UpPTS | |
| | DwPTS | Normal cyclic prefix in uplink | Extended cyclic prefix in uplink | | DwPTS | Normal cyclic prefix in uplink | Extended cyclic prefix in uplink |
| 0 | 6592 · $T_s$ | 2192 · $T_s$ | 2560 · $T_s$ | | 7680 · $T_s$ | 2192 · $T_s$ | 2560 · $T_s$ |
| 1 | 19760 · $T_s$ | | | | 20480 · $T_s$ | | |
| 2 | 21952 · $T_s$ | | | | 23040 · $T_s$ | | |
| 3 | 24144 · $T_s$ | | | | 25600 · $T_s$ | | |
| 4 | 26336 · $T_s$ | | | | 7680 · $T_s$ | 4384 · $T_s$ | 5120 · $T_s$ |
| 5 | 6592 · $T_s$ | 4384 · $T_s$ | 5120 · $T_s$ | | 20480 · $T_s$ | | |
| 6 | 19760 · $T_s$ | | | | 23040 · $T_s$ | | |
| 7 | 21952 · $T_s$ | | | | 12800 · $T_s$ | | |
| 8 | 24144 · $T_s$ | | | | - | - | - |
| 9 | 13168 · $T_s$ | | | | - | - | - |

FIG. 4

| Special Subframe configuration | Normal CP | | | Extended CP | | |
|---|---|---|---|---|---|---|
| | DwPTS | GP | UpPTS | DwPTS | GP | UpPTS |
| 10 | 3 | 8 | 3 | 3 | 6 | 3 |
| 11 | 4 | 7 | 3 | 4 | 5 | 3 |
| 12 | 5 | 6 | 3 | 5 | 4 | 3 |
| 13 | 6 | 5 | 3 | 6 | 3 | 3 |
| 14 | 7 | 4 | 3 | 7 | 2 | 3 |
| 15 | 8 | 3 | 3 | 8 | 1 | 3 |
| 16 | 9 | 2 | 3 | 3 | 5 | 4 |
| 17 | 10 | 1 | 3 | 4 | 4 | 4 |
| 18 | 3 | 7 | 4 | 5 | 3 | 4 |
| 19 | 4 | 6 | 4 | 6 | 2 | 4 |
| 20 | 5 | 5 | 4 | 7 | 1 | 4 |
| 21 | 6 | 4 | 4 | | | |
| 22 | 7 | 3 | 4 | | | |
| 23 | 8 | 2 | 4 | | | |
| 24 | 9 | 1 | 4 | | | |
| ... | ... | ... | ... | ... | ... | ... |
| 28 | 3 | 1 | 10 | | | |
| 43 | 3 | 1 | 10 | 3 | 1 | 8 |

FIG. 8

| | Subframe index n | | | | | | | | | |
|---|---|---|---|---|---|---|---|---|---|---|
| | 0 | 1 | | 2 | 3 | 4 | 5 | 6 | | 7 | 8 | 9 |
| | | 1st symbol of UpPTS | 2nd symbol of UpPTS | | | | | 1st symbol of UpPTS | 2nd symbol of UpPTS | | | |
| $K_{SRS}$ in case UpPTS length of 2 symbols | | 0 | 1 | 2 | 3 | 4 | | 5 | 6 | 7 | 8 | 9 |
| $K_{SRS}$ in case UpPTS length of 1 symbol | | 0 | | 2 | 3 | 4 | | 6 | | 7 | 8 | 9 |

FIG. 9

| | Subframe index n | | | | | | | | | | | | | | | | | |
|---|---|---|---|---|---|---|---|---|---|---|---|---|---|---|---|---|---|---|
| | 0 | 1 [special subframe] | | | | | 2 | 3 | 4 | 5 | 6 [special subframe] | | | | | 7 | 8 | 9 |
| | | 1st | 2nd | 3rd | 4th | 5th | | | | | 1st | 2nd | 3rd | 4th | 5th | | | |
| K_SRS in case UpPTS length of 1 symbols | 0 | 1 | - | - | - | - | 2 | 3 | 4 | | 6 | - | - | - | - | 7 | 8 | 9 |
| K_SRS in case UpPTS length of 2 symbols | 0 | 0 | 1 | - | - | - | 2 | 3 | 4 | | 5 | 6 | - | - | - | 7 | 8 | 9 |
| K_SRS in case UpPTS length of 3 symbols | 0 | 0 | 1 | 2 | - | - | 2 | 3 | 4 | | 6 | 7 | 8 | - | - | 7 | 8 | 9 |
| K_SRS in case UpPTS length of 4 symbols | 0 | 0 | 1 | 2 | 3 | - | 3 | 4 | 5 | | 7 | 8 | 9 | 10 | - | 9 | 10 | 11 |
| K_SRS in case UpPTS length of 5 symbols | 0 | 0 | 1 | 2 | 3 | 4 | 4 | 5 | 6 | | 8 | 9 | 10 | 11 | 12 | 13 | 14 | 15 |

FIG. 10

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

FIG. 11

| | Subframe index n | | | | | | | | | | | | | |
|---|---|---|---|---|---|---|---|---|---|---|---|---|---|---|
| | 0 | 1 (special subframe) | | | | | 2 | 3 | 4 | 5 | 6 (special subframe) | | | | | 7 | 8 | 9 |
| | | 1st | 2nd | 3rd | 4th | 5th | | | | | 1st | 2nd | 3rd | 4th | 5th | | | |
| K_SRS in case UpPTS length of 1 symbols | | 1 | – | – | – | – | 2 | 3 | 4 | | 6 | – | – | – | – | 7 | 8 | 9 |
| K_SRS in case UpPTS length of 2 symbols | | 0 | 1/X1 | – | – | – | 2 | 3 | 4 | | 5 | 6/X2 | – | – | – | 7 | 8 | 9 |
| K_SRS in case UpPTS length of 3 symbols | | 0 | 1/X1 | X2 | – | – | 2 | 3 | 4 | | 5 | 6/X3 | X4 | – | – | 7 | 8 | 9 |
| K_SRS in case UpPTS length of 4 symbols | | 0 | 1/X1 | X2 | X3 | | 2 | 3 | 4 | | 5 | 6/X4 | X5 | X6 | | 7 | 8 | 9 |
| K_SRS in case UpPTS length of 5 symbols | | 0 | 1/X1 | X2 | X3 | X4 | 2 | 3 | 4 | | 5 | 6/X5 | X6 | X7 | X8 | 7 | 8 | 9 |

FIG. 12

| SRS Configuration Index | Binary | Configuration Period $T_{SFC}$ (subframes) | Transmission offset $T_{\Delta SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 8} |
| 13 | 1101 | 10 | {1, 4, 6, 7} |
| 14 | 1110 | reserved | reserved |
| 15 | 1111 | reserved | reserved |

FIG. 16

| | Subframe index n | | | | | | | | | |
|---|---|---|---|---|---|---|---|---|---|---|
| | 0 | 1 (special subframe) | | 2 | 3 | 4 | 5 | 6 (special subframe) | | 7 | 8 | 9 |
| | | 1st | 2nd | | | | | 1st | 2nd | | | |
| $K_{SRS}$ in case extended UpPTS length of 1 symbols | | 1 | - | | | | | 3 | - | | | |
| $K_{SRS}$ in case extended UpPTS length of 2 symbols | | 0 | 1 | | | | | 2 | 3 | | | |

FIG. 17

| | Subframe index n | | | | | | | | | | | | | |
|---|---|---|---|---|---|---|---|---|---|---|---|---|---|---|
| | 0 | 1 | | | | 2 | 3 | 4 | 5 | 6 | | | | 7 | 8 | 9 |
| | 1st symbol of UpPTS | 2nd symbol of UpPTS | 3rd symbol of UpPTS | 4th symbol of UpPTS | | | | | 1st symbol of UpPTS | 2nd symbol of UpPTS | 3rd symbol of UpPTS | 4th symbol of UpPTS | | | |
| $K_{SRS}$ in case UpPTS length of 4 symbols | 0 | 1 | 2 | 3 | | | | | 5 | 6 | 7 | 8 | | | |
| $K_{SRS}$ in case UpPTS length of 2 symbols | 0 | 1 | | | | | | | 5 | 6 | | | | | |

FIG. 18

| SRS Configuration Index $I_{SRS}$ | SRS Periodicity $T_{SRS,1}$ (ms) | SRS Subframe Offset $T_{offset,1}$ |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ -10 |
| 15-24 | 10 | $I_{SRS}$ -15 |
| 25-31 | reserved | reserved |

FIG. 19

| SRS Configuration Index $I_{SRS}$ r13 | SRS Periodicity $T_{SRS}$ r13 (ms) | SRS Subframe Offset $T_{offset}$ r13 |
|---|---|---|
| 0 | 2 | 0,1 |
| 1 | 2 | 0, 2 |
| 2 | 2 | 0,3 |
| 3 | 2 | 1,2 |
| 4 | 2 | 1, 3 |
| 5 | 2 | 2,3 |
| 6-9 | 4 | $I_{SRS}$ r13-6 |
| 10-17 | 8 | $I_{SRS}$ r13-10 |
| 18-31 | reserved | reserved |

METHOD AND APPARATUS FOR COMMUNICATION IN WIRELESS COMMUNICATION SYSTEM

CROSS-REFERENCE TO RELATED APPLICATION(S)

This application is a continuation application of prior application Ser. No. 15/235,841, filed on Aug. 12, 2016, which has issued as U.S. Pat. No. 10,425,940 on Sep. 24, 2019 and was based on and claimed priority under 35 U.S.C. § 119(e) of a U.S. Provisional application filed on Aug. 13, 2015 in the U.S. Patent and Trademark Office and assigned Ser. No. 62/204,686, a U.S. Provisional application filed on Sep. 24, 2015 in the U.S. Patent and Trademark Office and assigned Ser. No. 62/232,077, a U.S. Provisional application filed on Nov. 3, 2015 in the U.S. Patent and Trademark Office and assigned Ser. No. 62/250,239, and a U.S. Provisional application filed on Nov. 3, 2015 in the U.S. Patent and Trademark Office and assigned Ser. No. 62/250,304, the entire disclosure of each of which is hereby incorporated by reference.

TECHNICAL FIELD

The present disclosure relates to a communication method and apparatus of a wireless communication system. More particularly, the present disclosure relates to a sounding reference signal (SRS) transmission method of a terminal.

BACKGROUND

In order to meet increasing demand for wireless data traffic since the commercialization of 4G communication systems, the development focus has been on the $5^{th}$ Generation (5G) or pre-5G communication system. For this reason, the 5G or pre-5G communication system is called the beyond 4G network communication system or post long term evolution (LTE) system.

In order to accomplish high data rates, consideration is being given to implementing the 5G communication system on the millimeter Wave (mm Wave) band (e.g., 60 GHz band). In order to mitigate propagation loss and increase propagation distance, the 5G communication system is likely to accommodate various techniques such as beamforming, massive MIMO, Full Dimensional MIMO (FD-MIMO), array antenna, analog beamforming, and large scale antenna. Also, for throughput enhancement of the 5G communication system, research is being conducted on various techniques such as small cell, advanced small cell, cloud radio access network (cloud RAN), ultra-dense network, device to device communication (D2D), wireless backhaul, moving network, cooperative communication, coordinated multi-points (CoMP), and interference cancellation. Furthermore, the ongoing research includes the use of hybrid frequency-shift keying (FSK) and quadrature amplitude modulation (QAM) modulation and sliding window superposition coding (SWSC) as advanced coding modulation (ACM), filter bank multi carrier (FBMC), non-orthogonal multiple access (NOMA), and sparse code multiple access (SCMA).

FD-MIMO is a technique for dramatically improving the data throughput through UE-specific beamforming by applying beamforming weights using azimuth and elevation angle. An evolved node B (eNB) may estimate user equipment (UE)-specific beamforming weight in either of two methods. The first method is for the UE to estimate the beamforming weight based on the reference signal transmitted by the eNB in downlink and feed back the estimated beamforming weight to the eNB. The first method is suitable for frequency division duplex (FDD). The second method is for the eNB to estimate the beamforming weight based on the sounding reference signal (SRS) transmitted by the UE. The second method is more suitable for time division duplex (TDD) with uplink/downlink reciprocity.

As described above, UE-specific beamforming can be used on the condition that the UE transmits the SRS. The SRS can be transmitted in the last symbol of a subframe. The index of the subframe carrying the SRS is the subframe index fulfilling the cell-specific condition and UE-specific condition for SRS transmission. The SRS transmission can be shared by up to 16 UEs, but it is impossible to support up to 16 UEs if the number of transmission antennas of a UE is increased to 4 and frequency hopping is used. Therefore, there is a need of SRS capacity enhancement in the FD-MIMO system to support UE-specific beamforming.

Various SRS capacity enhancement methods are being considered. The first SRS capacity enhancement method is to transmit SRS at the position of the demodulation reference signal (DMRS) of the physical uplink shared channel (PUSCH). The second method is to transmit the SRS on PUSCH resources. The third method is to increase the number of SRS comb types. That is, this method increases SRS sequences that are orthogonal on the frequency axis.

These methods can be used in both FDD and TDD, but a drawback is that they are incompatible with legacy UEs. In the first method, the UL DMRS and the SRS are overlapped in whole or in part so as to degrade channel estimation performance. Also, the first method imposes a restriction in that UL DMRS resource allocation should be performed in a consecutive manner to minimize the cubic metric. Thus, if the unused DMRS resources are not consecutive over the entire band, performance is inefficient. The second method can support the coexistence of the legacy UE and the SRS through a scheduling scheme of the eNB, but the scheduling scheme is restrictive. The third method has a drawback in that a new comb type allocated for SRS capacity enhancement breaks orthogonality with the legacy SRS, which results in a coexistence problem.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for increasing the number of single carrier—frequency division multiple access (SC-FDMA) symbols for sounding reference signal (SRS) transmission in an uplink pilot time slot (UpPTS) in order to achieve SRS capacity enhancement. Another aspect of the present disclosure is to provide a radio resource control (RRC) and distributed computing infrastructure (DCI) design method for trigger types 0 and 1 SRS transmissions to increase the number of SC-FDMA symbols carrying the SRS in the UpPTS for SRS capacity enhancement.

In accordance with an aspect of the present disclosure, a method by a terminal in a wireless communication system is provided. The method includes receiving a first message comprising first information indicating a number of symbols in an uplink pilot time slot (UpPTS) region, identifying at least one symbol for transmitting a sounding reference signal (SRS) based on the first information, and transmitting the SRS.

In accordance with another aspect of the present disclosure, a terminal for use in a wireless communication system is provided. The terminal includes a transceiver configured to transmit and receive signals and at least one processor configured to receive a first message comprising first information indicating a number of symbols in an uplink pilot time slot (UpPTS) region, identify at least one symbol for transmitting a sounding reference signal (SRS) based on the first information, and transmit the SRS.

In accordance with another aspect of the present disclosure, a method by a base station in a wireless communication system is provided. The method includes transmitting a first message comprising first information indicating a number of symbols in an uplink pilot time slot (UpPTS) region, and receiving a sounding reference signal (SRS) using at least one symbol, wherein the at least one symbol is identified based on the first information.

In accordance with still another aspect of the present disclosure, a base station of a wireless communication system is provided. The base station includes a transceiver configured to transmit and receive signals and at least one processor configured to transmit a first message comprising first information indicating a number of symbols in an uplink pilot time slot (UpPTS) region, and receive a sounding reference signal (SRS) using at least one symbol, wherein the at least one symbol is identified based on the first information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a table listing lengths of downlink pilot time slot (DwPTS)/guard period (GP)/uplink pilot time slot (UpPTS) available in a special subframe according to a special subframe configuration according to an embodiment of the present disclosure;

FIG. 4 is a diagram illustrating a special subframe configuration table according to an embodiment of the present disclosure;

FIG. 8 is a diagram illustrating a subframe index table for SRS transmission in a time division duplex (TDD) mode according to an embodiment of the present disclosure;

FIG. 9 is a diagram illustrating a subframe index table for extended SRS transmission in a TDD mode according to an embodiment of the present disclosure;

FIG. 10 is a diagram illustrating an SRS configuration index table containing UE-specific SRS configuration information for a UE in a TDD mode according to an embodiment of the present disclosure;

FIG. 11 is a diagram illustrating a subframe index table for extended SRS transmission in a TDD mode according to an embodiment of the present disclosure;

FIG. 12 is a diagram illustrating an SRS configuration index table containing cell-specific SRS configuration information for use in a TDD mode according to an embodiment of the present disclosure;

FIG. 16 is a diagram illustrating a subframe index table for extended SRS transmission in a TDD mode according to an embodiment of the present disclosure;

FIG. 17 is a diagram illustrating a subframe index table for extended SRS transmission in a TDD mode according to an embodiment of the present disclosure;

FIG. 18 is a diagram illustrating an SRS configuration index table containing UE-specific SRS configuration information in a TDD mode according to an embodiment of the present disclosure;

FIG. 19 is a diagram illustrating an SRS configuration index table containing UE-specific SRS configuration information for extended SRS transmission in a TDD mode according to an embodiment of the present disclosure;

The same reference numerals are used to represent the same elements throughout the drawings.

DETAILED DESCRIPTION

Figure 1:
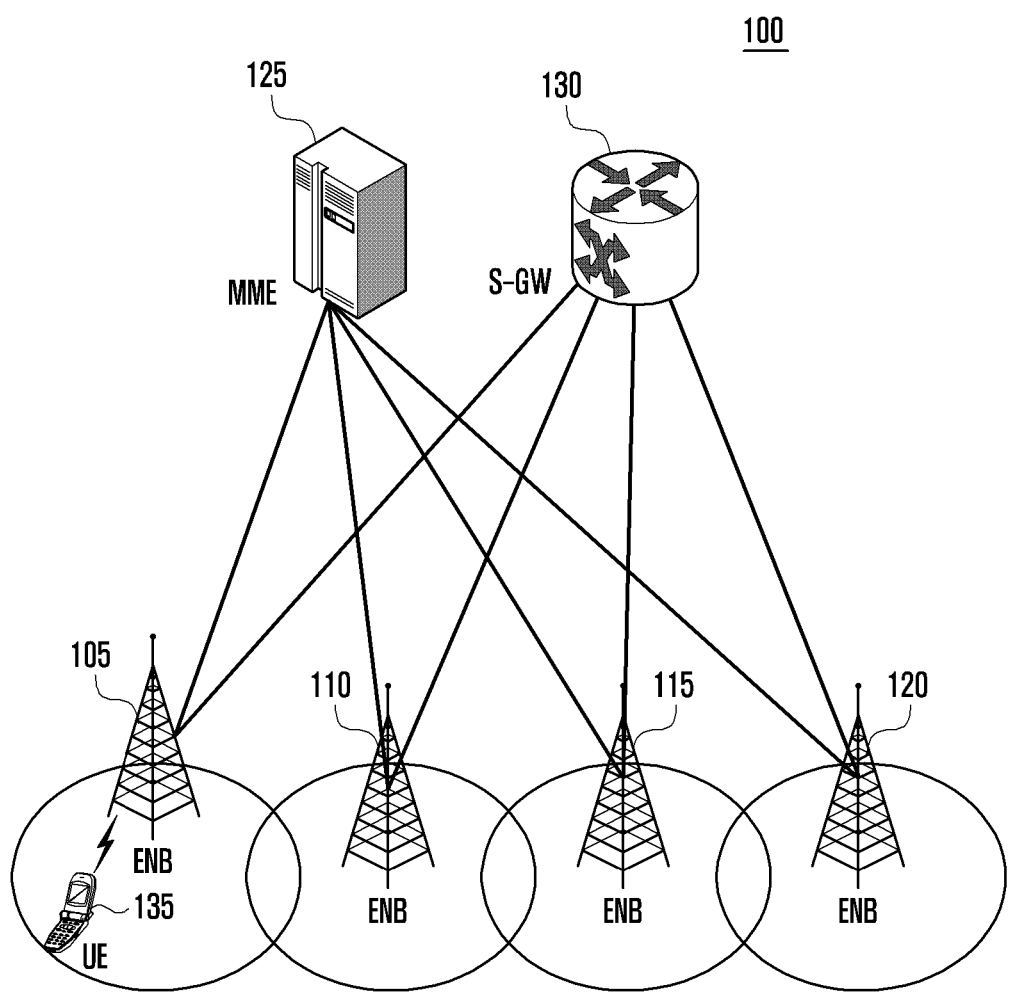
FIG. 1 is a diagram illustrating a long term evolution (LTE) system architecture according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to an advanced Evolved Universal Terrestrial Radio Access (EUTRA) (or LTE-A) supporting carrier aggregation (CA), it will be understood by those skilled in the art that the present disclosure can be applied to other communication systems having a similar technical background and channel format, with a slight modification, without departing from the spirit and scope of the present disclosure. For example, the subject matter of the present disclosure can be applied to a multi-carrier high speed packet access (HSPA) system.

Detailed description of well-known functions and structures incorporated herein may be omitted to avoid obscuring the subject matter of the present disclosure. This aims to omit unnecessary description so as to make the subject matter of the present disclosure clear.

For the same reason, some elements are exaggerated, omitted or simplified in the drawings and, in practice, the elements may have sizes and/or shapes different from those shown in the drawings. The same reference numbers are used throughout the drawings to refer to the same or like parts.

Advantages and features of the present disclosure and methods of accomplishing the same may be understood more readily by reference to the following detailed description of various embodiments and the accompanying drawings. The present disclosure may, however, be embodied in many different forms and should not be construed as being limited to the various embodiments set forth herein. Rather, these various embodiments are provided so that this disclosure will be thorough and complete and will fully convey the concept of the disclosure to those skilled in the art, and the present disclosure will only be defined by the appended claims.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

According to various embodiments of the present disclosure, the term "module" means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Hereinafter, various embodiments of the present disclosure are described with reference to the accompanying drawings.

First, a description is made of the architecture of a long term evolution (LTE) system according to an embodiment of the present disclosure.

FIG. 1 is a diagram illustrating LTE system architecture according to an embodiment of the present disclosure.

Referring to FIG. 1, the radio access network 100 of the LTE system includes evolved Node Bs (eNBs or base stations) 105, 110, 115, and 120, a mobility management entity (MME) 125, and a Serving Gateway (S-GW) 130. A user equipment (UE or terminal) 135 connects to an external network via the eNBs 105, 110, 115, and 120 and the S-GW 130.

In FIG. 1, the eNBs 105, 110, 115, and 120 are equivalent to the legacy node Bs of a universal mobile telecommunications system (UMTS). The UE 135 establishes a radio link to one of the eNBs 105, 110, 115, and 120, which take charge of more control functions than the legacy node B.

In the LTE system, all user traffic including the real time services such as voice over IP (VoIP) are served through a shared channel and thus there is a need of an entity capable of collecting per-UE state information (such as buffer status, allowed transmission power state, and channel status) and scheduling the UEs based on the state information. The eNBs 105, 110, 115, and 120 are responsible for these functions. Typically, one eNB has multiple cells. The LTE system adopts orthogonal frequency division multiplexing (OFDM) as a radio access technology in the bandwidth of 20 MHz. The LTE system also adopts adaptive modulation and coding (AMC) to determine the modulation scheme and channel coding rate in adaptation to the channel condition of the UE.

The S-GW 130 is an entity to provide data bearers so as to establish and release data bearers under the control of the MME 125. The MME 125 is responsible for mobility management of UEs and various control functions and may be connected to a plurality of eNBs.

Figure 2:
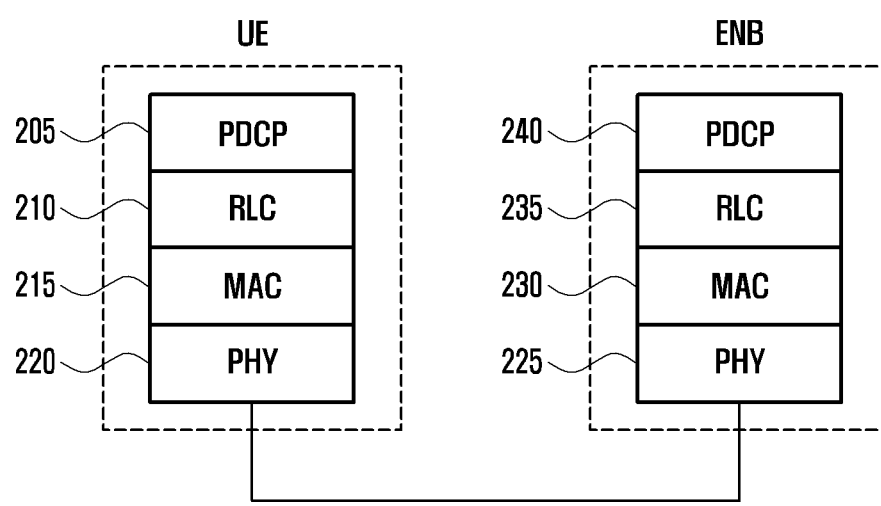
FIG. 2 is a diagram illustrating a protocol stack of an interface between a user equipment (UE) and an evolved node B (eNB) in an LTE system according to an embodiment of the present disclosure.

FIG. 2 is a diagram illustrating a protocol stack of an interface between a UE and an eNB in an LTE system according to and embodiment of the present disclosure.

Referring to FIG. 2, the protocol stack of the interface between the UE and the eNB in the LTE system includes a plurality of protocol layers stacked from the bottom to the top. A physical layer as denoted by reference numbers 220 and 225, a medium access control (MAC) layer as denoted by reference numbers 215 and 230, a radio link control (RLC) layer as denoted by reference numbers 210 and 235, and a packet data convergence control (PDCP) layer as denoted by reference numbers 205 and 240.

The PDCP layer 205 and 240 is responsible for internet protocol (IP) header compression/decompression, and the RLC layer 210 and 235 is responsible for segmenting a PDCP protocol data unit (PDU) into segments of appropriate size for an automatic repeat request (ARQ) operation.

The MAC layer 215 and 230 is responsible for establishing connection to a plurality of RLC entities so as to multiplex the RLC PDUs into MAC PDUs and demultiplex the MAC PDUs into RLC PDUs. The PHY layer 220 and 225 performs channel coding on the MAC PDU and modulates the MAC PDU into OFDM symbols to transmit over a radio channel or performs demodulating and channel-decoding on the received OFDM symbols and delivers the decoded data to the higher layer.

Various embodiments of the present disclosure are directed to a method for transmitting more sounding reference signals (SRSs) by increasing the number of SC-FDMA symbols in an uplink pilot time slot (UpPTS) of a special subframe in a time division duplex (TDD) frame structure.

According to various embodiments of the present disclosure, it is possible to achieve SRS capacity enhancement independent of coexistence with legacy UEs. By minimizing the guard period (GP) length to 1 symbol, it is possible to secure up to 8 SC-FDMA symbols for SRS transmission in one special subframe, resulting in SRS capacity enhancement. However, the increase of the UpPTS means the reduction of the GP. Logically, the cell coverage may be determined as, but is not limited to, in the range from about 10 km (guard interval: 1 symbol) to 80 km (guard interval: 8 symbols) according to the length of the UpPTS.

In order to include additional SC-FDMA symbols for SRS transmission in the UpPTS, there are two points to be considered. The first point relates to how to notify the UE of the number of UpPTS SC-FDMA symbols to be used for SRS transmission. The second point relates to how to design the subframe indices in the frame for supporting more symbols.

First, a description is made of a method for notifying a UE of a number of UpPTS SC-FDMA symbols for SRS transmission according to various embodiments of the present disclosure.

A first method is implemented by designing a new configuration of a special subframe for newly supporting more UpPTS SC-FDMA symbols.

FIG. 3 is a table of listing lengths of downlink pilot time slot (DwPTS)/guard period (GP)/uplink pilot time slot (UpPTS) available in a special subframe according to a special subframe configuration included in a system information block (SIB) according to an embodiment of the present disclosure. FIG. 4 is a diagram illustrating a special subframe configuration table according to an embodiment of the present disclosure Referring to FIG. 3, the length of the DwPTS may become 3, 9, 10, or 11 according to the special subframe configuration while the length of the UpPTS is 1 or 2 symbols. Since the special subframe has a length of 14 symbols for a normal cyclic prefix (CP) scenario, it is possible to regard the remaining symbols, with the exception of DwPTS and UpPTS, as GP.

Referring to FIG. 4, the lengths of the DwPTS, GP, and UpPTS in a special subframe may change by increasing the length of the UpPTS in the range of 3 to 10.

Here, it is assumed that the minimum length of the GP is equal to or greater than one symbol. In this way, it is possible to notify the UE of the length of the UpPTS using the special subframe configuration. However, a legacy UE cannot understand a configuration index greater than 9 because this information is conveyed in a system information block (SIB).

The second method is to transmit configuration information for SRS capacity enhancement using a radio resource control (RRC) message.

Figure 5:
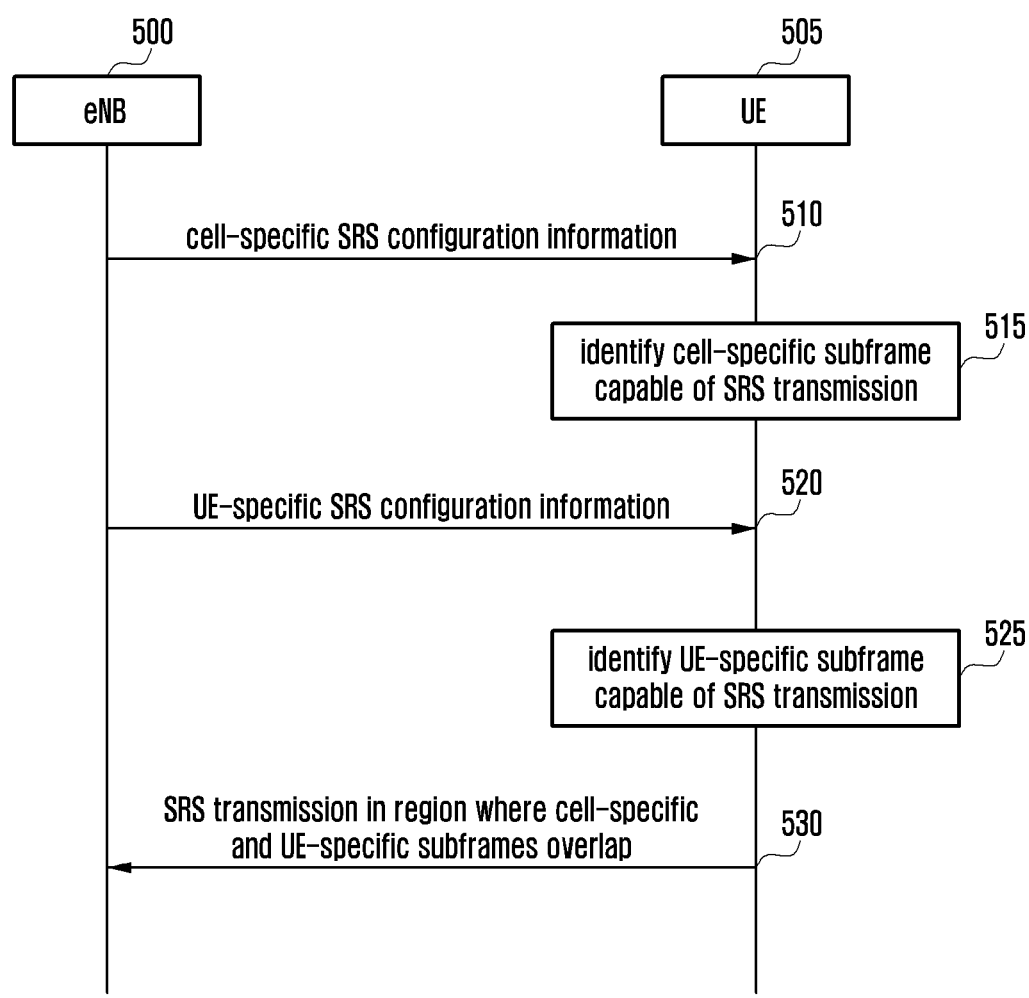
FIG. 5 is a signal flow diagram illustrating a sounding reference signal (SRS) configuration and transmission procedure according to an embodiment of the present disclosure.

FIG. 5 is a signal flow diagram illustrating an SRS configuration and transmission procedure according to an embodiment of the present disclosure.

Generally, an eNB broadcasts cell-specific SRS configuration information for UEs within a cell and transmits UE-specific SRS configuration information to a dedicated UE. Thus, the UE may determine the subframe area for transmitting SRS based on the configuration information.

Referring to FIG. 5, an eNB 500 transmits cell-specific SRS configuration information to a UE 505 at operation 510. For example, the cell-specific SRS configuration information may be transmitted in an SIB or an RRC message. The UE 505 (e.g., advanced UE) may identify a cell-specific subframe for SRS transmission based on the cell-specific SRS configuration information at operation 515.

The eNB 500 may transmit the UE-specific SRS configuration information to the UE 505 at operation 520. For example, the cell-specific SRS configuration information and UE-specific SRS configuration information may be transmitted in the same RRC message. The UE 505 (e.g., advanced UE) may identify the UE-specific subframe for SRS transmission based on the UE-specific SRS configuration information at operation 525. At this time, the UE-specific SRS configuration information may include the newly defined extended SRS configuration in addition to the SRS configuration for legacy SRS transmission. For example, the UE 505 may receive a first message including legacy SRS configuration information and a second message including the extended SRS configuration information.

The UE 505 may transmit the SRS in an area where the cell-specific subframe and the UE-specific subframe are overlapped at operation 530.

In an embodiment, it may be assumed to use the special subframe configuration 0 or 5, i.e., a case where DwPTS is 3, to transmit the SRS in the extended UpPTS based on the newly defined extended SRS configuration. Although it is possible to increase the number of symbols in the UpPTS in other configurations for SRS transmission, interference with the DwPTS should be considered. The eNB transmits special subframe configuration information to the UEs within the cell by means of a system information block (SIB). For example, in the case of the special subframe configuration 0 or 5, all UEs can check that the DwPTS is made up of 3 symbols which means that the GP and the UpPTS occupy 11 symbols.

A UE can be allocated one or more UpPTS symbols for SRS transmission. Although the UE can transmit the SRS over the entire band in one symbol if the uplink coverage is large enough, a power-limited UE located at the cell edge transmits the SRS in a frequency hopping mode within a narrow band and, in this case, consecutive symbols are allocated in the UpPTS.

There are two methods for increasing the coverage of a UE. The first UE coverage enhancement method is for the UE to transmit a narrow band SRS as described above. As shown in FIG. 4, the UE may be allocated consecutive symbols to transmit the SRS over the channels of the entire band in a frequency hopping pattern. Here, it is assumed that two symbols are added for SRS transmission in the UpPTS. If the number of symbols increases, the frequency hopping pattern may be changed. By using this transmission pattern, it is possible to achieve a gain of 3 dB in comparison with the case of using one symbol. The frequency hopping pattern may be notified to the UE dedicatedly via an RRC message or the distributed computing infrastructure (DCI).

The second UE coverage enhancement method is to use an orthogonal code in the time domain. For example, if the number of symbols for SRS transmission in the UpPTS is even, it is possible to use the orthogonal code.

Figure 7:
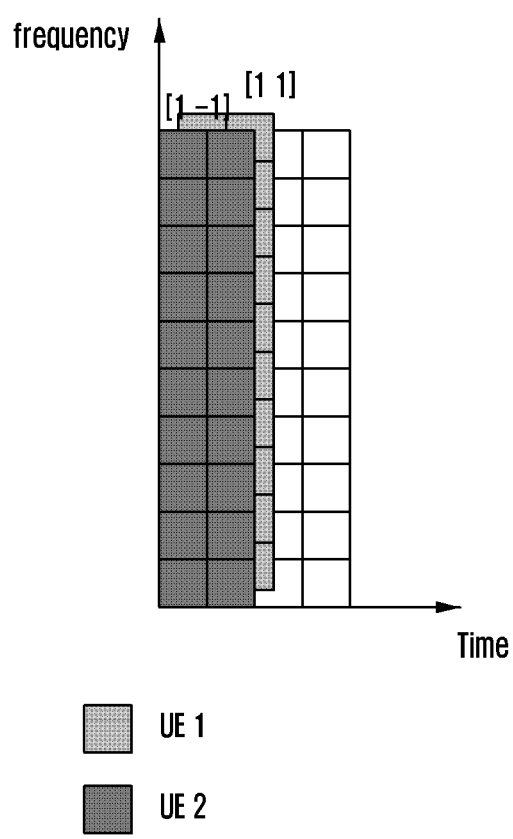
FIG. 7 is a diagram illustrating a resource grid for explaining SRS transmission with time domain orthogonal covering codes (OCC) according to an embodiment of the present disclosure.

FIG. 7 is a diagram illustrating a resource grid for explaining SRS transmission with time domain orthogonal covering codes (OCC) according to an embodiment of the present disclosure.

Figure 6:
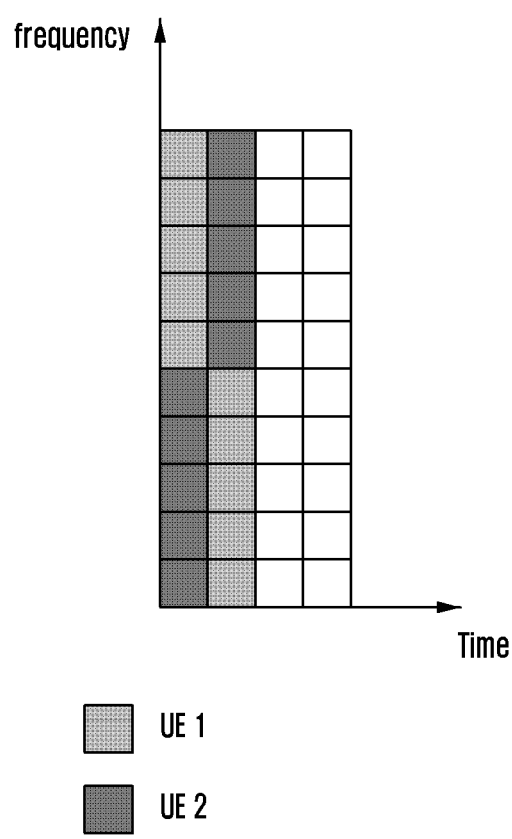
FIG. 6 is a diagram illustrating a resource grid for explaining SRS transmission with frequency hopping according to an embodiment of the present disclosure.

Referring to FIG. 7, both the UE1 and UE2 transmit the SRS over the entire band across two symbols so as to achieve a gain of 3 dB as in the method of FIG. 6. Here, the two UEs use different time-orthogonal codes so as to perform estimation without interference with each other. Unlike FIG. 6, the eNB has to allocate the orthogonal code to the UE using the RRC message or DCI.

A description is made hereinafter of how to design subframe indices in a frame to support more symbols in determining UE-specific subframe at operation 525 of FIG. 5.

FIG. 8 is a diagram illustrating a subframe index table for SRS transmission in a time division duplex (TDD) mode according to an embodiment of the present disclosure.

In more detail, FIG. 8 illustrates subframe indices k for the cases of 1-symbol UpPTS and 2-symbol UpPTS, which are determined according to the special subframe configuration in the SIB.

Since one frame spans 10 ms, the subframe indices are defined to support the periodicity of 2, 5, or 10 ms. In FIG. 8, the subframe index region denotes the SRS transmission region for the UpPTS length of 1 or 2 symbols.

The first method for supporting more symbols in determining UE-specific subframes is to increase the value of the subframe index in the frame according to the number of UpPTS SC-FDMA symbols.

By applying the first method, the table of FIG. 8 can be extended as shown in FIG. 9.

FIG. 9 is a diagram illustrating a subframe index table for extended SRS transmission in a TDD mode according to an embodiment of the present disclosure.

Referring to FIG. 9, as the number of UpPTS symbols increases from 3 to 5, the subframe index increments sequentially. If the number of UpPTS symbols is 1 or 2, the subframe indices are allocated as shown in FIG. 3. In order to extend the number of UpPTS symbols to 10, it is necessary to increase the subframe index sequentially.

However, if the subframe index is increased in accordance with the UpPTS, this has a drawback in that the specification has to be modified.

Equation (1) is used to determine UE-specific subframes in consideration of the subframe index value. Equation (1) can be applied to the extended SRS configuration as well as the legacy SRS configuration for SRS transmission.

$$\begin{cases} (10 \cdot n_f + k_{SRS} - T_{offset}) \bmod T_{SRS} = 0 & \text{if } T_{SRS} > 2 \quad \text{Equation 1} \\ (k_{SRS} - T_{offset}) \bmod 5 = 0 & \text{if } T_{SRS} = 2 \\ \vdots & \end{cases}$$

In Equation (1), $k_{SRS}$ denotes a subframe index, $T_{SRS}$ denotes an SRS periodicity, and $T_{offset}$ denotes an offset value. $T_{SPS}$ and $T_{offset}$ are determined based on the SRS configuration index ($I_{SRS}$) included in the legacy SRS configuration information or extended SRS configuration information. The UE-specific subframe determined according to Equation (1) may be a subframe or a UpPTS symbol.

For example, the SRS periodicity and offset value corresponding to the SRS configuration index ($I_{SRS}$) may be determined according to the table of FIG. 10.

FIG. 10 is a diagram illustrating an SRS configuration index table containing UE-specific SRS configuration information for a UE in a TDD mode according to an embodiment of the present disclosure.

Referring to FIG. 10, a table of parameters for trigger type 0 is illustrated. In the table, each of the SRS configuration indices of 0 to 644 indicates an SRS periodicity and subframe offset. According to various embodiments of the present disclosure, it is possible to use the parameters as shown in FIG. 10 for extended SRS configuration and to define SRS configuration indices over 645 corresponding to all SRS periodicities and subframe offsets for supporting the subframe indices. According to various embodiments, another equation may be defined for extended SRS configurations in addition to Equation (1).

A second method for supporting more symbols in determining the UE-specific subframe is to reuse the values of the subframe index $k_{SRS}$ in the frame. That is, it may be possible to reuse Equation (1) and the parameters of FIG. 10 without modification by reallocating the subframe numbers in the extended area.

FIG. 11 is a diagram illustrating a subframe index table for extended SRS transmission in a TDD mode according to an embodiment of the present disclosure.

Referring to FIG. 11, the subframe indices are allocated in the same way as in the legacy method regardless of the symbol length of UpPTS, and the newly added UpPTS symbols are allocated certain subframe indices. The subframe indices allocated to the newly added area may be X1, X2, . . . , X15, and X16 according to the UpPTS symbol length. A value in the range of {0, . . . , 9} may be allocated to the newly added area. The values between X1 and X8 are allocated to the UE dedicatedly through an RRC message or a DCI format. Although the embodiment of FIG. 11 is directed to the case of extending up to 5 symbols, the present disclosure is not limited by the number of symbols.

A description is made hereinafter of a method for allocating SRS transmission subframes with application of the second embodiment.

The UE may estimate cell-specific SRS transmission subframes based on the cell-specific SRS configuration information transmitted in an SIB or an RRC message. The cell-specific SRS configuration information may include SRS transmission subframe configuration information.

FIG. 12 is a diagram illustrating an SRS configuration index table containing cell-specific SRS configuration information for use in a TDD mode according to an embedment of the present disclosure.

Referring to FIG. 12, the srs-SubframeConfig is a cell-specific parameter transmitted to the UE using the SIB or RRC message. The UE may estimate the subframe fulfilling $[n_s/2] \bmod T_{SFC} \in \Delta_{SFC}$ using the SRS periodicity and offset values. For example, assuming Srs-SubframeConfig is set to 2, the cell-specific SRS transmission subframe indices of 1, 3, 6, and 8 are estimated.

In the case that the SRS index configuration as a parameter of the UE-specific SRS configuration information is set to 1, the SRS periodicity is 2 and the offset is 0 and 2 as shown in FIG. 10. In this case, the UE estimates the UE-specific SRS transmission subframe indices as 0, 2, 5, and 7 by substituting the SRS periodicity and offset for $(k_{SRS}-T_{offset}) \bmod 5=0$.

Afterward, the UE can transmit the SRS in the subframe fulfilling the UE-specific subframe and cell-specific subframe conditions. Accordingly, referring to FIG. 8, the UE may transmit the SRS in the subframes 1 and 6.

Figure 13:
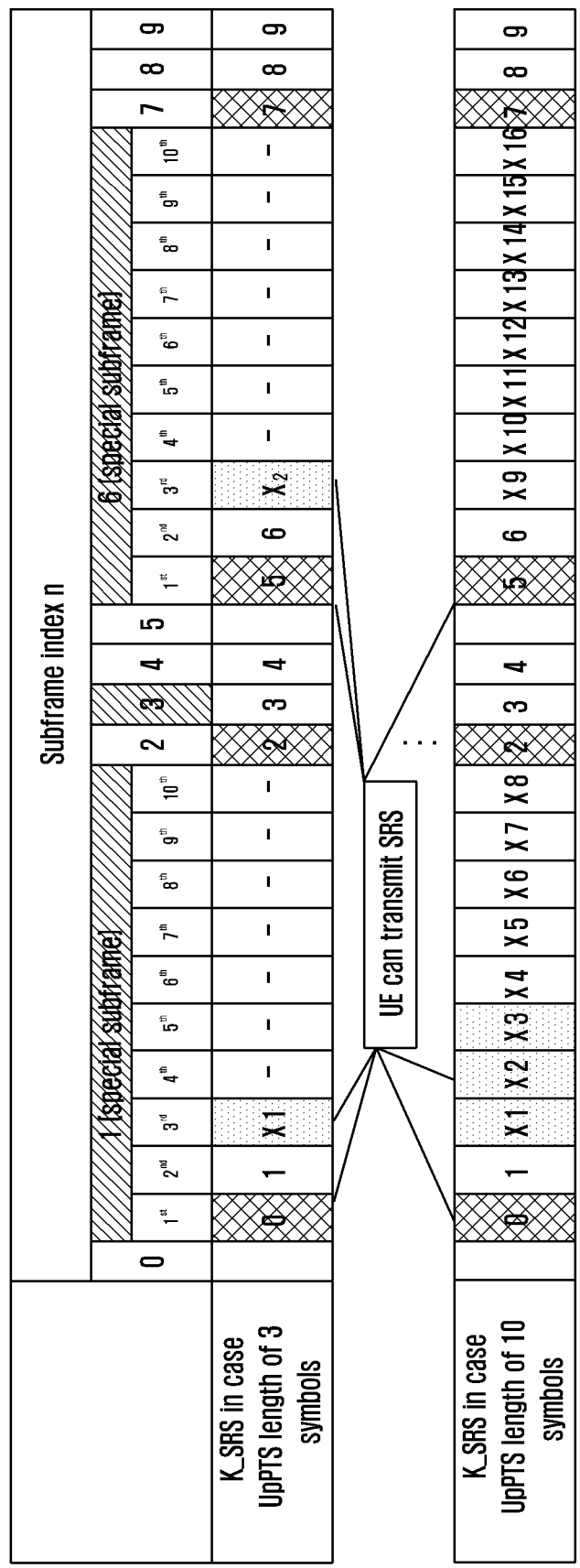
FIG. 13 is a diagram illustrating a radio frame structure for explaining an SRS transmission region determined based on cell-specific and UE-specific SRS configuration information in a TDD mode according to an embodiment of the present disclosure.

FIG. 13 is a diagram illustrating a radio frame structure for explaining an SRS transmission region determined based on cell-specific and UE-specific SRS configuration information in a TDD mode according to an embodiment of the present disclosure.

Referring to FIG. 13, by applying additional SC-FDMA symbols to the UpPTS and allocating the resource to the UE in the form of X1=X=2, X3=2, it is possible to transmit the SRS in an area satisfactory for both the UE-specific and cell-specific subframes simultaneously. The embodiment of FIG. 13 includes the cases of increasing the number of SC-FDMA symbols up to 10 in the UpPTS.

In the case of supporting the coexistence of the legacy area and the extended area as described above, consideration should be given on how to use a hopping pattern. If only one hopping pattern is used in the legacy and extended areas, it is impossible for the legacy UE to transmit the SRS in the extended symbols, and the periodicity mismatch between the hopping patterns of the legacy UE and the advanced UE may lead to interference between the hopping patterns.

Figure 14:
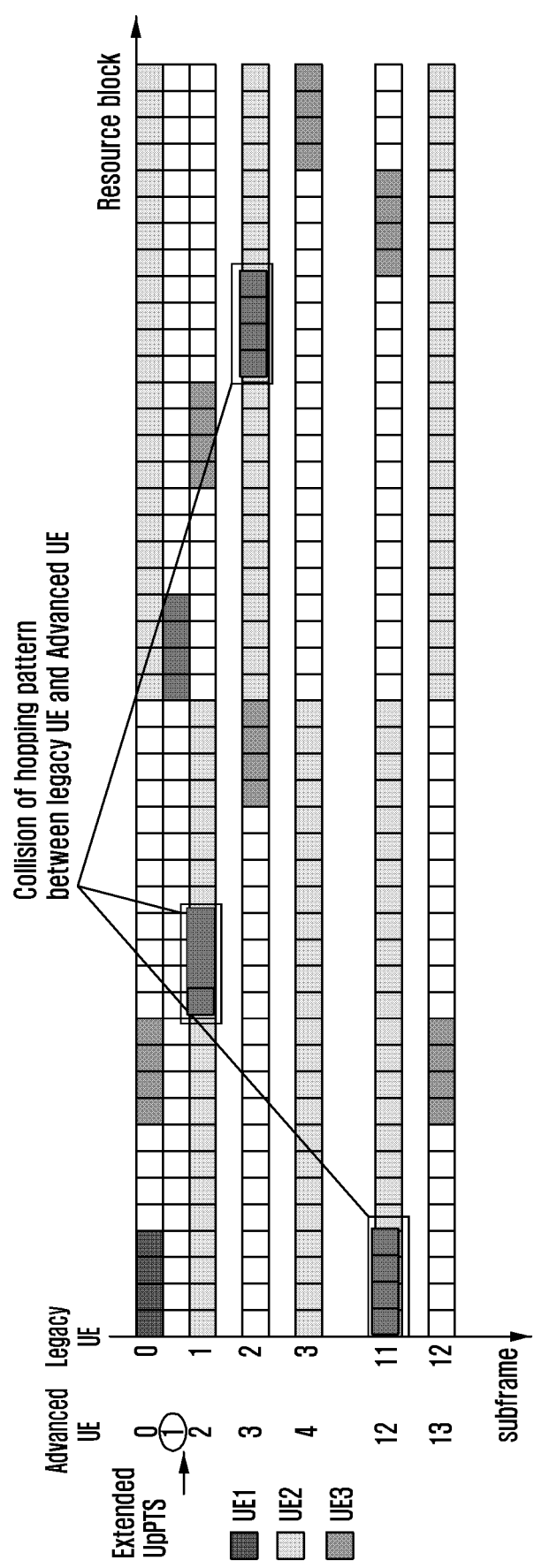
FIG. 14 is a diagram illustrating a resource structure for explaining a hopping pattern interference problem occurring by extended SRS transmission in a TDD mode according to an embodiment of the present disclosure.

FIG. 14 is a diagram illustrating a resource structure for explaining a hopping pattern interference problem occurring by extended SRS transmission in a TDD mode according to an embodiment of the present disclosure.

Referring to FIG. 14, interference between the hopping patterns is illustrated. In the present disclosure, the term "legacy UE" denotes the UE which does not support the extended SRS configuration, and the term "advanced UE" denotes the UE supporting the extended SRS configuration.

In order to minimize interference between the hopping patterns, the eNB is restricted in scheduling.

A description is made hereinafter of a method for separating the extended UpPTS area and the legacy UpPTS area for SRS transmission.

Figure 15:
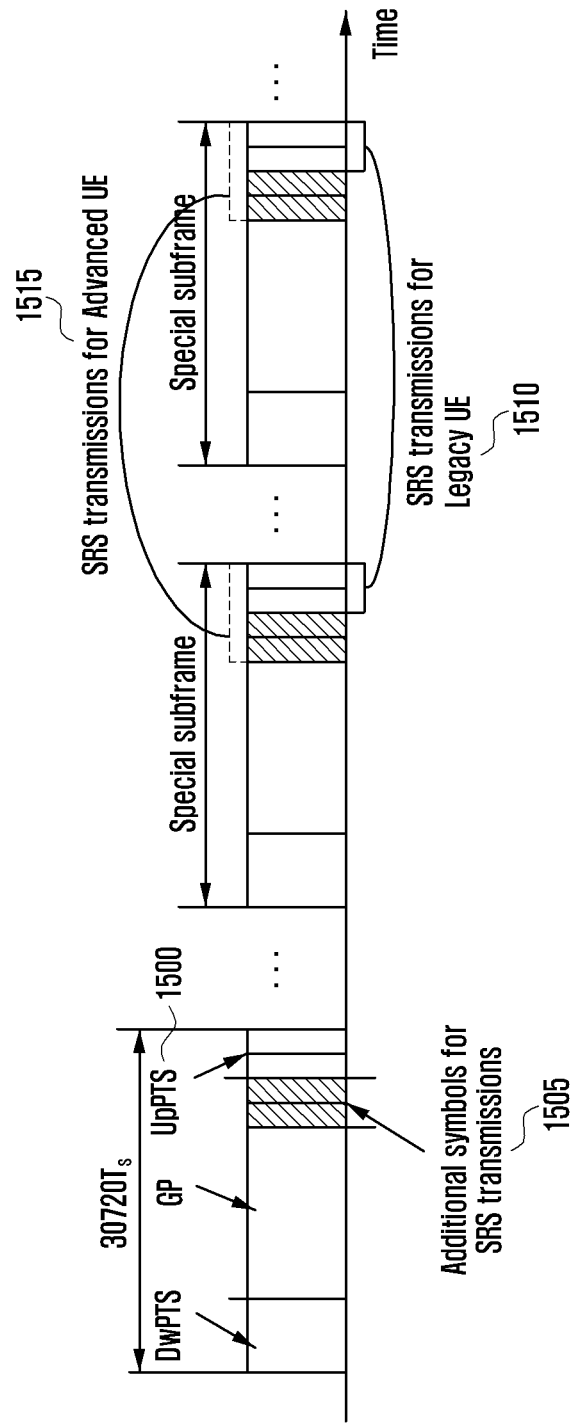
FIG. 15 is a diagram for explaining extended SRS transmission in a TDD mode according to an embodiment of the present disclosure.

FIG. 15 is a diagram for explaining extended SRS transmission in a TDD mode according to an embodiment of the present disclosure.

Referring to FIG. 15, a case where the UpPTS is extended as much as 2 symbols for SRS capacity enhancement is illustrated. By separating an extended UpPTS symbol 1505 and a legacy UpPTS symbol 1500, it is possible to avoid the hopping pattern interference shown in FIG. 14. This is because one hopping pattern is used in the legacy area and another hopping pattern is used in the extended area. The advanced UE may transmit SRS of the trigger type 0 or 1 in the area 1515 including the legacy UpPTS and extended UpPTS. Meanwhile, the legacy UE may transmit SRS of the trigger type 0 or 1 in the area 1510 including only the legacy UpPTS.

In order to transmit the SRS under the assumption that the extended and legacy areas are a single area, the advanced UE may calculate the SRS transmission subframes using one SRS configuration information. In order to use the legacy and extended areas separately, however, the UE has to use different SRS configuration information for SRS transmission. That is, the UE uses different hopping patterns in the legacy and extended areas.

For SRS transmission in the extended area, the UE should have a capability of checking the subframe index value $k_{SRS}$ for the extended area and calculating UE-specific SRS transmission subframes based thereon in a similar way to the SRS transmission in the legacy region.

FIG. 16 is a diagram illustrating a subframe index table for extended SRS transmission in a TDD mode according to an embodiment of the present disclosure. In more detail, FIG. 16 is a diagram illustrating an example of defining a new subframe index $k_{SRS}$ for transmitting SRS in an extended area.

Referring to FIG. 16, it is assumed that the UpPTS can have up to two extended symbols, but the present disclosure is not limited thereto. As shown in FIG. 16, in the case of defining a new subframe index for transmitting SRS in the extended area, it is preferred to define a new equation and/or parameter for calculating the UE-specific SRS transmission frame based on the subframe index.

FIG. 17 is a diagram illustrating a subframe index table for extended SRS transmission in a TDD mode according to an embodiment of the present disclosure. In more detail, FIG. 17 is a diagram illustrating an example of defining a new subframe index $k_{SRS}$ for transmitting SRS in an extended area according to an embodiment of the present disclosure.

Referring to FIG. 17, the subframe index is numbered so as to operate in the periodicity of 5 ms, which is equal to that of the subframe index of the legacy method. That is, subframes 0 to 4 are allocated subframe indices of 0 to 4, and subframes 5 to 9 are allocated subframe indices of 5 to 9. In FIG. 17, if the extended UpPTS consists of two symbols, the two symbols during the subframes 0 to 4 are allocated 0 and 1, and the two symbols during the subframes 5 to 9 are allocated 5 and 6. If the extended UpPTS consists of four symbols, the four symbols of subframes 0 to 4 are allocated 0 to 4, and the four symbols during the subframes 5 to 9 are allocated 5 to 8. However, the present disclosure is not limited thereto. In this way, it is possible to reuse Equation (1) for calculating the SRS transmission subframes and the SRS configuration index table of FIG. 10.

For example, it may be necessary to include the following expression in the 3GPP TS36.213. This is necessary for transmitting SRS of trigger type 0 using the extended UpPTS. In the following text, Table 8.2.-3-b denotes the table of FIG. 17. Also, SoundingRS-UL-ConfigDedicated-extendedUpPTS denotes the SRS configuration defined newly for transmitting the SRS in the extended UpPTS.

Type 0 triggered SRS transmission instances in a given serving cell for TDD serving cell with $T_{SRS}>2$ and for FDD serving cell are the subframes satisfying $(10-n_f+$ $k_{SRS}-T_{offset}$) mod $T_{SRS}=0$, where, for FDD $k_{SRS}=\{0, 1, \ldots 9\}$ is the subframe index within the frame, for TDD serving cell $k_{SRS}$ is defined in Table 8.2-3 if SoundingRS-UL-ConfigDedicated is configured or in Table 8.2-3-b if SoundingRS-UL-ConfigDedicated-extendedUpPTS is configured. The SRS transmission instances for TDD serving cell with $T_{SRS}=2$ are the subframes satisfying ($k_{SRS}-T_{offset}$) mod $5=0$.

Meanwhile, as the number of extended UpPTS symbols increases up to 8 as described above, the number of subframe indices may increase according to the number of extended symbols in FIGS. 16 and 17. However, in the case of defining the subframe index newly for SRS transmission only in the extended area, if the number of extended symbols is small as in the example of FIG. 16, this may cause degradation of periodic SRS transmission efficiency. That is, the SRS transmission period of each UE should be set to a long time to support a plurality of UEs because one frame includes 4 SRS transmission subframes. Accordingly, the extended area may be preferable for aperiodic SRS transmission.

For example, it may be necessary to include the following expression concerning trigger type 1 SRS transmission through the extended UpPTS in the 3GPP TS36.312.

In the following text, table 8.2.-3-b denotes the table of FIG. 17. Also, Sounding-UL-ConfigDedicated-extendedUpPTS denotes the SRS configuration defined newly for transmitting the SRS in the extended UpPTS.

Trigger type 1 SRS configuration of a UE in a serving cell for SRS periodicity, $T_{SRS,1}$, and SRS subframe offset, $T_{offset, 1}$, is defined in Table 8.2-4 and Table 8.2-5, for FDD and TDD serving cell, respectively. The periodicity $T_{SRS,1}$ of the SRS transmission is serving cell specific and is selected from the set $\{2, 5, 10\}$ ms or subframes.

For the SRS periodicity $T_{SRS,1}$ of 2 ms in TDD serving cell, two SRS resources are configured in a half frame containing UL subframe(s) of the given serving cell.

A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.

A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.

A UE configured for type 1 triggered SRS transmission on serving cell c upon detection of a positive SRS request in subframe n of serving cell c shall commence SRS transmission in the first subframe satisfying n+k, k≥4 and ($10-n_f+k_{SRS}-T_{offset, 1}$) mod $T_{SRS, 1}=0$ for TDD serving cell c with $T_{SRS,1}>2$ and for FDD serving cell c, ($k_{SRS}-T_{offset, 1}$) mod $5=0$ for TDD serving cell c with $T_{SRS,1}=2$ where for FDD serving cell c $k_{SRS}=\{0, 1, \ldots 9\}$ is the subframe index within the frame $n_f$, for TDD serving cell c $k_{SRS}$ is defined in Table 8.2-3 if SoundingRS-UL-ConfigDedicatedAperiodic is configured or in Table 8.2-3-b if SoundingDedicatedAperiodic-extendedUpPTS is configured.

FIG. 18 is a diagram illustrating an SRS configuration index table containing UE-specific SRS configuration information in a TDD mode according to an embodiment of the present disclosure. In more detail, FIG. 18 is a diagram illustrating the SRS periodicity $T_{SRS}$ and offset value $T_{offset}$ according to the SRS configuration index $I_{SRS}$ for trigger type 1 SRS transmission according to an embodiment of the present disclosure.

Referring to FIG. 18, for trigger type 1 SRS transmission in the extended UpPTS, the information provided in FIGS. 17 and 18 may be used as an example. As described above, if the subframe indices of FIG. 17 are used for trigger type 1 SRS transmission, it is possible to reuse Equation (1) for trigger type 1 SRS transmission and SRS configuration index table of FIG. 10.

However, use of the SRS configurations indices 10~14, 15~24, and 25~31 may be allowed but use of the SRS configuration indices 1~9 is not allowed. If the SRS configuration indices 1~9 are used, this may cause an error of transmitting the SRS twice in one subframe.

The parameters necessary for transmitting SRS in the extended area are exemplified as follows.

```
SoundingRS-UL-configDedicatedr13 ::== CHOICE{
...
    srs_ConfigIndex-r13    n bits
    Time-OCC-r13           2 bits
    srs-UpPTSr13           2 bits
    transmissionComb       2 bits
    NewSRSIndicator        2 bits 2b'01: SRS TM 1, 2b'10: SRS TM 2, 2b'11: SRS TM 3
...
}
```

The parameters necessary for transmitting the SRS may be transmitted to the UE in an RRC message or DCI format. Although it is possible to transmit the SRS most dynamically using the DCI, it is difficult to define extra information in the DCI format. Accordingly, it is preferable to transmit the SRS to the UE using an RRC message.

It is necessary to include that the SRS transmission subframe configuration information (srs-configuration index) is used in the legacy area and extended area as shown in FIG. 9. Also, there is a need of transmissionComb for supporting comb4 type. The transmissionComb is the information indicating a subframe pattern for SRS transmission. Also, Time-OCC-r13 is necessary for supporting time domain OCC. The Time-Occ-r13 may indicate two or more codes (e.g., [1 1], [1 −1]). Srs-UpPTSr13 is the information indicating the number of symbols to be used in the extended UpPTS. NewSRSIndicator is a parameter defined for the advanced UE.

NewSRSIndicator is the information notifying the advanced UE of whether the SRS is transmitted in the extended and/or legacy areas. For example, this parameter is set to 01 for SRS transmission in the legacy area, 10 for SRS transmission in the extended area, and 11 for SRS transmission in both the legacy and extended areas.

In the case of aperiodic SRS transmission, the NewSRS-Indicator may be replaced by a DCI format-based trigger. A method for triggering aperiodic SRS transmission in the extended area may include the following method. For example, it is possible to indicate whether to perform aperiodic SRS transmission in the legacy area or the extended area using the 1-bit information added in the DCI format. For this purpose, it may be possible to define explicitly new 1-bit information in the DCI or use implicitly 1 bit of a legacy field. It may also be possible to define this information in the RRC message like NewSRSIndicator.

According to various embodiments of the present disclosure, a new RRC parameter (e.g., extended SRS configuration) is required in association with the UE-specific configuration in addition to the legacy SRS configuration for trigger type 0 (ex. periodic) and trigger type 1 (ex. aperiodic) SRS transmissions in the extended area. According to various embodiments, the UE may receive a parameter for SRS transmission in the legacy area or the extended area or the parameters for the SRS transmissions in the legacy and extended areas and, in this case, it may select one or both of the parameters for SRS transmission in one or both of the legacy and extended areas.

The RRC message for trigger type 0 SRS transmission in the legacy area is exemplified as follows.

```
PhysicalConfigDedicated :: == SEQUENCE {
sounding-RS-UL-ConfigDedicated     SoundingRS-UL-ConfigDedicated
OPTIONAL,                           -- Need ON
}
SoundingRS-UL-ConfigDedciated :: == CHOICE{
    release            NULL,
    setup              SEQUENCE {
      srs-Bandwidth              ENUMERATED {bw0, bw1, bw2, bw3},
      srs-HoppingBandwidth       ENUMERATED {hbw0, hbw1, hbw2, hbw3},
      freqDomainPosition         INTEGER (0..23),
      duration                   BOOLEAN,
      srs-ConfigIndex            INTEGER (0..1023),
      transmissionComb           INTEGER (0..1),
      cyclicShift                ENUMERATED {cs0, cs1, cs2, cs3, cs4, cs5, cs6, cs7}
    }
}
SoundingRS-UL-ConfigDedicated-v1020 :: == SEQUENCE {
    srs-AntennaPort-r10           SRS-AntennaPort
}
```

The UE may receive UE-specific SRS configuration information (soundingRS-UL-ConfigDedicated) from the eNB for trigger type 0 SRS transmission. Srs-Bandwidth is a parameter indicating the SRS transmission bandwidth, srs-HoppingBandwidth is a parameter indicating the bandwidth occupied for frequency hopping of the SRS, freqDomain-Position is a parameter indicating the location of the SRS within the frequency band, duration is a parameter indicating trigger type 0 transmission or single transmission, srs-ConfigIndex is a parameter of SRS transmission subframe configuration information for acquiring SRS periodicity and offset, transmissionComb is a parameter indicating the comb type (subcarrier pattern), and cyclicShift is a parameter indicating the cyclic shift.

The first method for transmitting the trigger type 0 SRS in the extended area is to perform SRS configuration through an RRC message as follows.

```
PhysicalConfigDedicated :: == SEQUENCE {
    Number-of-additional-Uppts       ENUMERATED {2symbols, 4symbols},
```

-continued

```
OPTIONAL   -- Need ON
    SoundingRS-UL-ConfigDedicated-extendedUpPts  SoundingRS-UL-
ConfigDedicated OPTIONAL,       -- NEED ON
}
SoundingRS-UL-ConfigDedicated-extendedUpPts ::==SEQUENCE {
    Number-of-combs       ENUMERATED {2combs, 4combs}
    transmissionComb-r13  INTEGER (0..3)
    cyclicShift-r13       ENUMERATED (cs0, cs1, cs2, cs3, cs4, cs5,
cs6, cs7, cs8, cs9, cs10, cs11),
    srs-Bandwidth         ENUMERATED {bw0, bw1, bw2, bw3}
    srs-HoppingBandwidth  ENUMERATED {hbw0, hbw1, hbw2, hbw3},
    freqDomainPosition    INTEGER (0..23),
    duration              BOOLEAN,
    srs-ConfigIndex       INTEGER (0..1023)
}
```

The RRC message is an example of an RRC message for trigger type 0 SRS transmission in the extended area according to an embodiment of the present disclosure. The UE may receive UE-specific SRS configuration information (SoundingRS-UL-COnfiguDedicated-extendedUpPTS) for trigger type 0 SRS transmission in the extended area. Here, the parameters added to the legacy configuration information include Number-of-combs indicating the number of combs (subcarrier pattern type for SRS transmission), transmission-Comb-r13 indicating comb type (subcarrier pattern for SRS transmission), and cyclicShift-r13 for supporting the cyclic shift up to 12. For example, Number-of-combs may indicate 2 combs supported in the legacy system or 4 combs supported newly.

Here, it should be noted that SoundingRs-UL-ConfigDedicated-extendedUpPTS is meaningful only when Number-of-additional-UpPTS is configured for indicating the number of extended symbols of UpPTS in the PhysicalConfigDedicated. For example, the indicated number of extended symbols of UpPTS is 2 or 4.

The second method for transmitting the trigger type 0 SRS in the extended or legacy area is to perform SRS configuration using an RRC message as follows.

```
SoundingRS-UL-ConfigDedicated-extendedUpPts ::== CHOICE{
    release     NULL,
    setup       SEQUENCE {
      Number-of-additional-UpPTS  ENUMERATED {2symbols,
                                              4symbols}
      srs-Bandwidtdh              ENUMERATED {bw0,bw1,bw2,
                                              bw3},
```

-continued

```
    srs-HoppingBandwidth       ENUMERATED {hbw0,hbw1,hbw2,
                               hbw3},
    freqDomainPosition         INTEGER (0..23),
    duration                   BOOLEAN,
    srs-ConfigIndex            INTEGER (0..1023),
    transmissionComb           INTEGER (0..3),
    cyclic Shift                                ENUMERATED
{cs0,cs1,cs2,cs3,cs4,cs5,cs6,cs7,cs8,cs9,cs10,cs11}
    Number-of-combs            INTEGER (0,..,3),
    }
}
```

The RRC message is exemplified for trigger type 0 SRS transmission in the extended area.

The eNB may allocate Sounding RS-UL-ConfigDedicated-extendedUpPTS to the UE without Number-of-additional-UpPTS condition. This message differs from the RRC message of the first message in that the SoundingRS-UL-ConfigDedicated-extendedUpPTS includes the Number-of-additional-UpPTS.

For example, if the Number-of-additional-UpPTS is set to 0, it is possible to set the parameter such that the SoundingRS-UL-ConfigDedicated-extendedUpPTS is compatible with the legacy SoundingRS-UL-ConfigDedicated and thus the UE can transmit the trigger type 0 SRS in the same format as the receipt of legacy SoundingRS-UL-ConfigDedicated.

The UE may receive one of the configuration information for trigger type 0 SRS transmission in the legacy area and the configuration information for trigger type 0 SRS transmission in the extended area to transmit the SRS according to the received RRC message or may receive information for both configurations. The information for both configurations may be transmitted in the same RRC message or separate RRC messages.

The third method for transmitting the trigger type 0 SRS in the extended area is to perform SRS configuration using an RRC message as follows.

the SRS in the extended area based on the extended RRC message. If the Number-of-additional-UpPTS is not signaled, the advanced UE transmits the SRS in the legacy area. The field for indicating whether the extended RRC message exists may be replaced by a field added newly. It may also be possible to add 1 bit for indicating the area to be used.

According to various embodiments, the UE may perform trigger type 0 SRS transmission as follows.

If both the legacy and extended RRC messages for trigger type 0 SRS transmission are received, the UE may transmit the trigger type 0 SRS based on the extended RRC message.

Or, if both the legacy and extended RRC messages for trigger type 0 SRS transmission are received, the UE transmits the trigger type 0 SRS based on the legacy RRC message.

Or, if both the legacy and extended RRC messages for trigger type 0 SRS transmission are received, the UE transmits the trigger type 0 SRS in both the legacy and extended areas based on both the messages.

Meanwhile, the trigger type 1 SRS transmission is configured through an RRC message and triggered by a DCI format. Concerning the trigger type 1 SRS transmission in the extended area, the following sentence may be included in the 3GPP TS36.213.

Trigger type 1 SRS configuration of a UE in a serving cell for SRS periodicity, $T_{SRS,1}$, and SRS subframe offset, $T_{offset,\ 1}$, is defined in Table 8.2-4 and Table 8.2-5, for FDD and TDD serving cell, respectively. The periodicity $T_{SRS,1}$ of the SRS transmission is serving cell specific and is selected from the set {2, 5, 10} ms or subframes.

For the SRS periodicity $T_{SRS,1}$ of 2 ms in TDD serving cell, two SRS resources are configured in a half frame containing UL subframe(s) of the given serving cell.

A UE configured for type 1 triggered SRS transmission in serving cell c and not configured with a carrier indicator field shall transmit SRS on serving cell c upon

```
PhysicalConfigDedicatedSCell-r10 ::= SEQUENCE {
...
-- UL configuration
ul-Configuration-r10 SEQUENCE {
antennaInfoUL-r10 AntennaInfoUL-r10 OPTIONAL, -- Need ON
pusch-ConfigDedicatedSCell-r10 PUSCH-ConfigDedicatedSCell-r10 OPTIONAL, -- Need ON
uplinkPowerControlDedicatedSCell-r10 UplinkPowerControlDedicatedSCell-r10 OPTIONAL, -- Need ON
cqi-ReportConfigSCell-r10 CQI-ReportConfigSCell-r10 OPTIONAL, -- Need ON
if(Number-of-additional-UpPTS){
   soundingRS-UL-ConfigDedicated-extended UpPTS SoundingRS-UL-ConfigDedicated-extended UpPTS
OPTIONAL, -- Need ON
else
   soundingRS-UL-ConfigDedicated-r10 SoundingRS-UL-ConfigDedicated OPTIONAL, -- Need ON
}
soundingRS-UL-ConfigDedicated-v1020
     SoundingRS-UL-ConfigDedicated-v1020 OPTIONAL, -- Need ON
soundingRS-UL-ConfigDedicatedAperiodic-r10
     SoundingRS-UL-ConfigDedicatedAperiodic-r10 OPTIONAL -- Need ON
} OPTIONAL, -- Cond CommonUL
```

The RRC message is exemplified for trigger type 0 SRS transmission in the extended area.

The UE may select one of the legacy RRC message and the extended RRC message and transmit the trigger type 0 SRS in the legacy or extended area depending on whether the Number-of-additional-UpPTS is signaled in the PhysicalConfigDedicatedCell-r10. That is, the Number-of-additional-UpPTS may be an indicator for indicating the area in which the UE transmits the SRS. That is, if the Number-of-additional-UpPTS is signaled, the advanced UE transmits detection of a positive SRS request in PDCCH/EPDCCH scheduling PUSCH/PDSCH on serving cell c.

A UE configured for type 1 triggered SRS transmission in serving cell c and configured with a carrier indicator field shall transmit SRS on a serving cell c upon detection of a positive SRS request in PDCCH/EPDCCH scheduling PUSCH/PDSCH with the value of carrier indicator field corresponding to the serving cell c.

A UE configured for type 1 triggered SRS transmission on serving cell c upon detection of a positive SRS request in subframe n of serving cell c shall commence SRS transmission in the first subframe satisfying n+k, k≥4 and $(10-n_f+k_{SRS}-T_{offset,\,1})$ mod $T_{SRS},1=0$ for TDD serving cell c with $T_{SRS},1>2$ and for FDD serving cell c, $(k_{SRS}-T_{offset,\,1})$ mod 5=0 for TDD serving cell c with $T_{SRS},1=2$ where for FDD serving cell c $k_{SRS}=\{0, 1, \ldots 9\}$ is the subframe index within the frame $n_f$, for TDD serving cell c $k_{SRS}$ is defined in Table 8.2-3 if SoundingRS-UL-ConfigDedicatedAperiodic is configured or in Table 8.2-3-b if SoundingDedicatedAperiodic-extendedUpPTS is configured.

Here, SoundingDedicatedAperiodic-extendedUpPTS denotes the newly defined SRS configuration information for transmitting the SRS in the extended area. Considering the current standard, it is possible to trigger this using the DCI formats 0, 1A, and 4 in TDD and FDD and further using DCI format 2B, 2C, and 2D in TDD. Here, the DCI formation uses a 1-bit SRS request field for triggering SRS transmission with the exception of DCI format 4. The SRS request field of the DCI format 4 is 2 bits. The trigger type 1 SRS transmission of the advanced UE should be performed in consideration of the resource configuration as follows.

First, the UE may transmit the trigger type 1 SRS configured based on the legacy RRC message in the legacy area.

Second, the UE may transmit the trigger type 1 SRS configured based on the extended RRC message in the extended area.

Similar to the trigger type 0 SRS transmission, it is necessary to determine whether to transmit the SRS in the legacy area or the extended area. This can be indicated by defining a 1-bit DCI or RRC field or by redefining a legacy field.

The RRC message for trigger type 1 SRS transmission in the legacy area is exemplified as follows.

```
SoundingRS-UL-ConfigDedicatedAperiodic-r10 ::= CHOICE{
    release NULL,
    setup SEQUENCE {
        srs-ConfigIndexAp-r10 INTEGER (0..31),
        srs-ConfigApDCI-Format4-r10 SEQUENCE (SIZE (1..3)) OF SRS-ConfigAp-r10 OPTIONAL, --Need ON
        srs-ActivateAp-r10 CHOICE {
            release NULL,
            setup SEQUENCE {
                srs-ConfigApDCI-Format0-r10 SRS-ConfigAp-r10,
                srs-ConfigApDCI-Format1a2b2c-r10 SRS-ConfigAp-r10,
                ...
            }
        } OPTIONAL -- Need ON
    }
}
SRS-ConfigAP-r10 ::= SEQUENCE {
    srs-AntennaPortAp-r10 SRS-AntennaPort,
    srs-BandwidthAp-r10 ENUMERATED {bw0, bw1, bw2, bw3},
    freqDomainPositionAp-r10 INTEGER (0..23),
    transmissionCombAp-r10 INTEGER (0..1),
    cyclicShiftAp-r10 ENUMERATED {cs0, cs1, cs2, cs3, cs4, cs5, cs6, cs7}
}
```

'srs-ConfigIndex-Ap-r10' denotes an SRS transmission subframe index for acquiring the trigger type 1 period and offset information; srs-ConfigApDCI-Format4-r10, srs-ConfigApDCI-Format0-r10, and srs-ConfigApDCI-Format1a1b2c-310 are SRS configuration information to be used for the respective DCI formats triggering the transmission.

The RRC message for trigger type 1 SRS transmission in the extended area is exemplified as follows.

```
SoundingRS-UL-ConfigDedicatedAperiodic-extendedUpPTS ::== CHOICE{
    release           NULL,
    setup             SEQUENCE {
        srs-ConfigIndexAp-extendedUpPTS        INTEGER (0..31),
        Number-of-additional-UpPTS             ENUMERATED {2symbols, 4symbols}
        srs-ConfigApDCI-Format4-r10            SEQUENCE (SIZE (1..3)) OF SRS-ConfigAp-r10       OPTIONAL, -- Need ON
        srs-ActivateAp-r10                     CHOICE {
            release          NULL,
            setup            SEQUENCE {
                srs-ConfigApDCI-Format0-r10         SRS-ConfigAp-r10,
                srs-ConfigApDCI-Format1a2b2c-r10    SRS-ConfigAp-r10,
                ...
            }
        }         OPTIONAL -- Need ON
    }
}
```

```
SRS-ConfigAp-extendedUpPTS :: == SEQUENCE {
    srs-AntennaPort Ap-r10              SRS-AntennaPort,
    srs-BandwidthAp-r10                 ENUMERATED {bw0,bw1,bw2,bw3},
    freqDomainPositionAp-r10            INTEGER (0..23),
    Number-of-Comb                      ENUMERATED {2combs, 4combs},
    transmissionCombAp-r13              INTEGER (0..3),
    cyclicShiftAp-r13                                               ENUMERATED
{cs0,cs1,cs2,cs3,cs4,cs5,cs6,cs7,cs8,cs9,cs10,cs11}
}
```

There is a need of a new configuration for trigger type 1 SRS transmission in the extended area with the new configuration to include an srs-ConfigIndexAp-extendedUpPTS field for acquiring period and offset information and a Number-of-additional-UpPTS field indicating the number of added symbols. The SRS-ConfigAp-extendedUpPTS as the configuration information indicating the sequence of the SRS subframe includes a Number-of-combs field indicating the number of supportable comb types, a transmissionCombAp-r13 field indicating the comb type, and a cyclicShiftAp-r13 field indicating the cyclic shift value to be used.

The UE determines whether to use the legacy area and/or the extended area for trigger type 2 SRS transmission as follows.

The first method for transmitting the trigger type 1 SRS is to define 1-bit information for indicating the area to be used in the DCI. The UE determines whether to transmit the trigger type 1 SRS in the legacy or extended area depending on whether the 1-bit information is set to 1 or 0, and the transmission is triggered by the SRS request in the legacy DCI. In this case, the RRC message is used for trigger type 1 SRS transmission in the legacy area and, in order to transmit the trigger type 1 SRS in the extended area, new configuration information (e.g., RRC message for configuring SRS transmission in the extended area).

Because the DCI can be used to indicate the resources to be used and to trigger transmission, this method is advantageous in terms of allocating resources dynamically, but it is disadvantageous in terms of requiring the definition of a new information field in the DCI.

The second method for transmitting the trigger type 1 SRS is to define new 1-bit information indicating the area to be used in the RRC message. For example, the RRC message as an extended version of the RRC message for configuring SRS transmission in the extended area includes 1-bit information of SRS Indicator as follows.

```
SoundingRS-UL-ConfigDedicatedAperiodic-r10 ::== CHOICE{
    release         NULL,
    setup           SEQUENCE {
        Alt1.
            srs-ConfigIndexAp-r10           INTEGER (0..31),
            SRS_indicator                   INTEGER (0,...,1),
            srs-ConfigApDCI-Format4-r10                     SEQUENCE (SIZE (1..3)) OF SRS-
ConfigAp-r10 OPTIONAL, -- Need ON
            srs-Activate Ap-r10             CHOICE {
                release     NULL,
                setup       SEQUENCE {
                    srs-ConfigApDCI-Format0-r10         SRS-ConfigAp-r10,
                    srs-ConfigApDCI-Format1a2b2c-r10        SRS-ConfigAp-r10,
                    ...
                }
            }           OPTIONAL -- Need ON
    }
}
```

In an embodiment, it may also be possible to add one of the information fields necessary for SRS transmission in the extended area to the legacy RRC message for configuring SRS transmission in the legacy area and to determine the area for transmitting the trigger type 2 SRS depending on whether or not this field exists. One of the fields necessary for SRS transmission in the extended area is added to the RRC message for configuring SRS transmission in the legacy area as follows.

```
SoundingRS-UL-ConfigDedicatedAperiodic-r10 ::= CHOICE{
    release NULL,
    setup SEQUENCE {
        srs-ConfigIndexAp-r10 INTEGER (0..31),
        srs-ConfigApDCI-Format4-r10 SEQUENCE (SIZE (1..3)) OF SRS-ConfigAp-r10 OPTIONAL, --Need ON
        Number-of-additional-UpPTS ENUMERATED {2symbols, 4symbols } --Optional
        srs-ActivateAp-r10 CHOICE {
            release NULL,
            setup SEQUENCE {
```

```
        srs-ConfigApDCI-Format0-r10 SRS-ConfigAp-r10,
        srs-ConfigApDCI-Format1a2b2c-r10 SRS-ConfigAp-r10,
        ...
      }
    } OPTIONAL -- Need ON
  }
}
SRS-ConfigAp-r10 ::= SEQUENCE {
  srs-AntennaPortAp-r10 SRS-AntennaPort,
  srs-BandwidthAp-r10 ENUMERATED {bw0, bw1, bw2, bw3},
  freqDomainPositionAp-r10 INTEGER (0..23),
  transmissionCombAp-r10 INTEGER (0..1),
  cyclicShiftAp-r10 ENUMERATED {cs0, cs1, cs2, cs3, cs4, cs5, cs6, cs7}
}
```

The information field for determining whether the extended RRC message exists in the legacy RRC message is added in the form of Number-of-additional-UpPTS. This information field may be replaced by another field newly defined in the extended RRC message.

An RRC message for explaining the method for indicating the RRC message for trigger type 0 SRS transmission is exemplified as follows.

A description is made hereinafter of another method for a UE to select one of the extended and legacy areas without giving priority to the extended area when an RRC message for trigger type 1 transmission is received.

The UE may acquire the configuration information for both the legacy and extended areas from the RRC message and determine the area to use as follows.

```
PhysicalConfigDedicatedSCell-r10 :: = SEQUENCE {
...
-- UL configuration
ul-Configuration-r10 SEQUENCE {
antennaInfoUL-r10 AntennaInfoUL-r10 OPTIONAL, -- Need ON
pusch-ConfigDedicatedSCell-r10 PUSCH-ConfigDedicatedSCell-r10 OPTIONAL, -- Need ON
uplinkPowerControlDedicatedSCell-r10 UplinkPowerControlDedicatedSCell-r10 OPTIONAL, -- Need ON
cqi-ReportConfigSCell-r10 CQI-ReportConfigSCell-r10 OPTIONAL, -- Need ON
soundingRS-UL-ConfigDedicated-r10 SoundingRS-UL-ConfigDedicated OPTIONAL, -- Need ON
soundingRS-UL-ConfigDedicated-v1020
      SoundingRS-UL-ConfigDedicated-v1020 OPTIONAL, -- Need ON
if(Number-of-additional-UpPTS){
   soundingRS-UL-ConfigDedicatedAperiodic-extended UpPTS soundingRs-UL-
ConfigDedicatedAperiodic--extended UpPTS OPTIONAL, -- Need ON
else
   soundingRS-UL-ConfigDedicatedAperiodic-r10 oundingRS-UL-ConfigDedicatedAperiodic-r10, -- Need
ON
}
```

The UE may select one of the legacy RRC message and the extended RRC message for trigger type 0 SRS transmission depending on whether Number-of-additional-UpPTS is included.

According to various embodiments, if the extended RRC message is not received, the UE transmits the trigger type 1 SRS in the legacy area and uses the SRS transmission subframe configuration information (srs-ConfigIndexAp-r10) in the same way as the legacy method. Otherwise, if the extended RRC message is received, the UE transmits SRS in the extended area and there is a need to use srs-ConfigIndexAp-r10 in a different way. In this case, it is necessary to adjust the SRS periodicity and subframe offset to match with the subframe index to transmit the trigger type 1 SRS transmission in the extended area.

FIG. 19 is a diagram illustrating an SRS configuration index table containing UE-specific SRS configuration information for extended SRS transmission in a TDD mode according to an embodiment of the present disclosure.

Referring to FIG. 19, SRS periodicity and subframe offset according to the SRS transmission subframe configuration information (SRS Configuration Index) which the UE has to reference for trigger type SRS transmission in the extended area are illustrated.

In order to avoid using the legacy area, the reserved areas corresponding to SRS configuration indices equal to or greater than 25 are used as "no transmission" areas in the SRS configuration index table (see FIG. 18). That is, the UE transmits the SRS only when the received SRS configuration index is a value in the range between 0 and 24. Otherwise, it does not transmit the SRS.

Similarly, in order to avoid transmitting trigger type 1 SRS in the extended area, the reserved areas corresponding to SRS configuration indices equal to or greater than 18 are used as "no transmission" areas in the SRS configuration index table (FIG. 18 or FIG. 19). That is, the UE transmits the SRS only when the received SRS configuration index is a value in the range between 0 and 17. Otherwise, it does not transmit the SRS. In this way, it is possible to designate an available SRS transmission area and transmit the trigger type 1 SRS based on the SRS_request in the DCI format in the same way as the legacy method. This method cannot allocate resources dynamically, but it is advantageous in terms of allowing for resource allocation at the RRC message transmission interval and negating the necessity of defining new information in the DCI.

Another method for transmitting the trigger type 1 SRS is to determine the resource area for SRS transmission by reusing a legacy field of the DCI format. For example, the DCI format includes a 5-bit MCS field indicating an MCS level and a new data indicator (NDI) field indicating new data. The MCS level can be set to a value in the range between 0 to 31, and the lowest three levels (MCS=29/30/31) are related to data retransmission. Accordingly, any combination between the NDI indicating new data and the lowest three MCS levels is not used in the current specification. Accordingly, it may be possible to use the combination of MCS=29 and NDI indicating new data to indicate SRS transmission in the legacy area and the combination of MCS=30 and NDI indicating new data to indicate SRS transmission in the extended area. Here, the trigger type 1 SRS may be transmitted based on the SRS request state. However, a drawback of this method is that it is impossible to set the MCS and NDI to values for actual uplink or downlink data transmission in order to designate an SRS transmission area.

Another method for transmitting the trigger type 1 SRS is to determine the resource area for SRS transmission by reusing a legacy field of an RRC message. Also, this method is advantageous in terms of negating the necessity of a new information field although defining a new field in the RRC message is less burdensome than defining a new field in the DCI.

According to various embodiments of the present disclosure, the UE may perform trigger type 1 SRS transmission as follows.

For example, if both the legacy and extended RRC messages for trigger type 1 SRS transmission are received, the UE may transmit the trigger type 1 SRS based on the extended RRC message. The legacy RRC message and extended RRC message for trigger type 1 SRS transmission may be transmitted in the same RRC message.

Or, if both the legacy and extended RRC messages for trigger type 1 SRS transmission are received, the UE may transmit the trigger type 1 SRS based on the legacy RRC message.

Or, if both the legacy and extended RRC messages for trigger type 1 SRS transmission are received, the UE may transmit the trigger type 1 SRS in both the legacy and extended areas based on the legacy and extended RRC messages.

Figure 20:
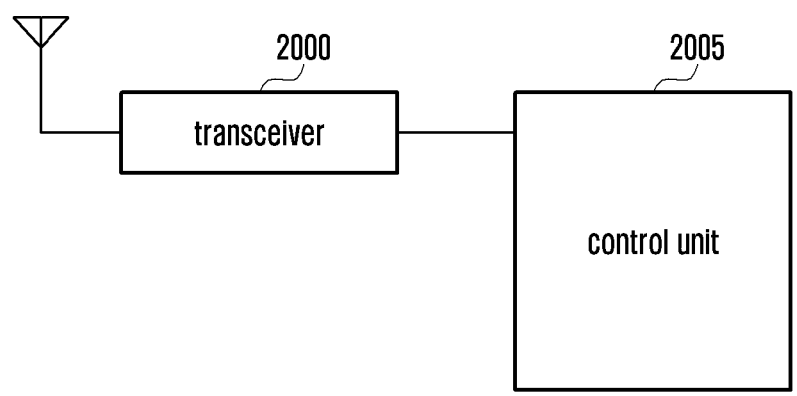
FIG. 20 is a block diagram illustrating a configuration of a UE according to an embodiment of the present disclosure.

FIG. 20 is a block diagram illustrating a configuration of a UE according to an embodiment of the present disclosure.

Referring to FIG. 20, the UE includes a transceiver 2000 and a control unit 2005.

The transceiver 2000 includes a communication module and takes charge of transmitting/receiving signals to/from an external device (e.g., eNB) under the control of the control unit 2005.

The control unit 2005 includes at least one processor and takes charge of controlling operations of the UE according to various embodiments of the present disclosure. For example, the control unit 2005 may control the UE operation in the procedure of FIG. 5 and other operations.

According to an embodiment, the control unit 2005 may control to receive at least one of the first and second SRS configuration messages. Among the first and second SRS configuration messages, if only the first SRS configuration message is received, the control unit 2005 may check at least one symbol for transmitting SRS based on the first UpPTS area. The first UpPTS area is determined based on the special subframe configuration included in the SIB. The control unit 2005 may allocate a subframe index to one or more symbols in the first UpPTS area, and determine the at least one symbol for transmitting SRS based on the Equation (1) and the subframe index.

Among the first and second SRS configuration messages, if only the second SRS configuration message is received, the control unit 2005 may check at least one symbol for transmitting SRS based on the second UpPTS area.

For example, the second SRS configuration message may include the information indicating the number of symbols of the second UpPTS area. For example, this information may indicate 2 or 4 symbols of the second UpPTS area. The second UpPTS area is determined based on the information indicating the number of symbols of the second UpPTS area and different from the first UpPTS area in the UpPTS area.

The control unit 2005 may allocate a subframe index to one or more symbols in the second UpPTS area, and determine the at least one symbol for transmitting SRS based on the Equation (1) and the subframe index.

The second SRS configuration message may include subcarrier pattern type indication information and the subcarrier pattern indication information for SRS transmission.

The second SRS configuration message may include at least one of a configuration message for an extended SRS transmission associated with a first trigger type and a configuration message for the extended SRS transmission associated with a second trigger type.

The control unit 2005 may control to receive cell-specific SRS transmission subframe configuration information.

Among the first and second SRS configuration messages, if only the first SRS configuration message is received, the control unit 2005 may transmit SRS in consideration of the subframe checked based on the SRS transmission subframe configuration information and the at least one symbol associated with the first UpPTS area. For example, it may be possible to transmit SRS in the area where the checked subframe and the at least one symbol associated with the first UpPTS area are overlapped.

Among the first and second SRS configuration messages, if at least the first SRS configuration message is received, the control unit 2005 may transmit SRS in consideration of the subframe checked based on the SRS transmission subframe configuration information and the at least one symbol associated with the second UpPTS area. For example, it may be possible to transmit SRS in the area where the checked subframe and the at least one symbol associated with the second UpPTS area are overlapped.

Figure 21:
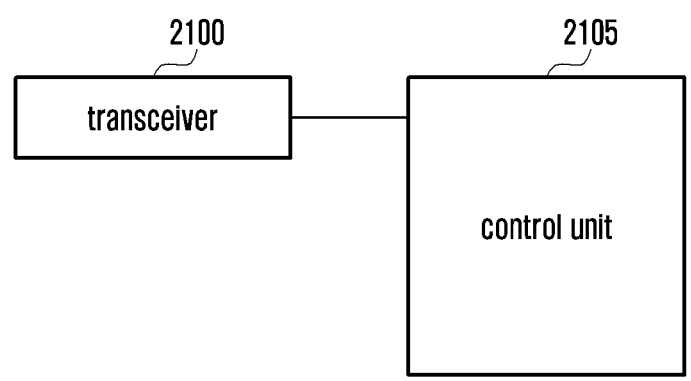
FIG. 21 is a block diagram illustrating a configuration of an eNB according to various embodiments of the present disclosure.

FIG. 21 is a block diagram illustrating a configuration of an eNB according to an embodiment of the present disclosure.

Referring to FIG. 21, the eNB includes a transceiver 2100 and a control unit 2105.

The transceiver 2100 includes a communication module and takes charge of transmitting/receiving signals to/from an external device (e.g., UE) under the control of the control unit 2105.

The control unit 2105 includes at least one processor and takes charge of controlling the operations of the UE according to various embodiments of the present disclosure. For example, the control unit 2105 may control the eNB operation in the procedure of FIG. 5 and other detailed operations.

For example, the control unit may transmit at least one of the first and second SRS configuration messages.

Among the first and second SRS configuration messages, if only the first SRS configuration message is transmitted, the control unit 2105 may control to receive the SRS transmitted in at least one symbol in the first UpPTS area. The first UpPTS area is determined based on the special subframe configuration included in the SIB.

Among the first and second SRS configuration messages, if only the second SRS configuration message is transmitted, the control unit 2105 may control to receive the SRS transmitted in at least one symbol in the second UpPTS area.

The second SRS configuration message may include the information indicating the number of symbols of the second UpPTS area. For example, the information indicating the number of symbols may indicate 2 or 4 symbols of the second UpPTS area. The second UpPTS area is determined based on the information indicating the number of symbols of the second UpPTS area and different from the first UpPTS area in the UpPTS area.

The second SRS configuration information may further include subcarrier pattern type indication information and subcarrier pattern indication information for SRS transmission.

The second SRS configuration message may include at least one of a configuration message for an extended SRS transmission associated with a first trigger type and a configuration message for the extended SRS transmission associated with a second trigger type.

The control unit 2105 may control to transmit cell-specific SRS transmission subframe configuration information.

Among the first and second SRS configuration messages, if only the first SRS configuration message is received, the control unit 2105 may control to receive the SRS in consideration of the subframe checked based on the SRS transmission subframe configuration information and the at least one symbol associated with the first UpPTS area. For example, it may be possible to receive the SRS in the area where the checked subframe and the at least one symbol associated with the first UpPTS area are overlapped.

Among the first and second SRS configuration messages, if only the second SRS configuration message is received, the control unit 2105 may control to receive the SRS in consideration of the subframe checked based on the SRS transmission subframe configuration information and the at least one symbol associated with the second UpPTS area. For example, it may be possible to receive the SRS in an area where the checked subframe and the at least one symbol associated with the second UpPTS area are overlapped.

As described above, the present disclosure is advantageous in terms of SRS capacity enhancement by increasing the number of SC-FDMA symbols for SRS transmission in the UpPTS.

The methods specified in the claims and specification can be implemented by hardware, software, or a combination of them. In the case of being implemented in software, it may be possible to store at least one program (software module) in a computer-readable storage medium. The at least one program stored in the computer-readable storage medium may be configured for execution by at least one processor embedded in an electronic device. The at least one program includes instructions executable by the electronic device to perform the methods described in the claims and specifications of the present disclosure. Such a program (software module or software program) may be stored in a non-volatile memory such as random access memory (RAM) and flash memory, read only memory (ROM), electrically erasable programmable ROM (EEPROM), a magnetic disc storage device, a compact disc-ROM (CD-ROM), digital versatile discs (DVDs) or other type of optical storage device, and a magnetic cassette. It may also be possible to store the program in a memory device implemented in combination of part or the entirety of the aforementioned media. The storage unit may include a plurality of memories. The program may be stored in an attachable storage device accessible through a communication network implemented as a combination of Internet, intranet, local area network (LAN), wireless LAN (WLAN), and storage area network (SAN). The storage device may be attached to the device performing the methods according to embodiments of the present disclosure by means of an external port. It may also be possible for a separate storage device installed on a communication network to attach to the device performing the methods according to embodiments of the present disclosure.

In embodiments of the present disclosure, the components are described in singular or plural forms depending on the embodiment. However, the singular and plural forms are selected appropriately for the proposed situation just for explanatory convenience without any intention of limiting the present disclosure thereto; thus, the singular form includes the plural forms as well, unless the context clearly indicates otherwise.

While the present disclosure has shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system supporting a time division duplex (TDD), the method comprising:
    receiving, from a base station, a radio resource control (RRC) message configuring an aperiodic sounding reference signal (SRS) transmission with extended uplink pilot time slot (UpPTS), the RRC message including first information associated with a transmission comb among 4 combs for the aperiodic SRS transmission, second information associated with a number of additional symbols in the extended UpPTS for the aperiodic SRS transmission, third information associated with a bandwidth for the aperiodic SRS transmission, fourth information associated with a periodicity and an offset, and fifth information indicating a time domain orthogonal cover code (OCC) for the terminal;
    receiving, from the base station on a physical downlink control channel (PDCCH), downlink control information (DCI);
    identifying a subframe for transmitting an aperiodic SRS based on the DCI and the second information;
    identifying at least one resource element in the subframe based on the first information;
    mapping the aperiodic SRS on the at least one resource element in the subframe; and
    transmitting, to the base station, the aperiodic SRS in the subframe based on the first information, the second information, the fourth information, and the fifth information, and on a band based on the third information,
    wherein a first hopping pattern is applied to at least one symbol other than the additional symbols in the subframe, and a second hopping pattern which is different from the first hopping pattern is applied to additional symbols.

2. The method of claim 1, wherein at least one bit included in the DCI indicates a parameter set for the aperiodic SRS from at least one parameter set configured by the RRC message.

3. A method performed by a base station in a wireless communication system supporting a time division duplex (TDD), the method comprising:
    transmitting, to a terminal, a radio resource control (RRC) message configuring an aperiodic sounding reference signal (SRS) transmission with extended uplink pilot time slot (UpPTS), the RRC message including first information associated with a transmission comb among 4 combs for the aperiodic SRS transmission, second information associated with a number of additional symbols in the extended UpPTS for the aperiodic SRS transmission, third information associated with a bandwidth for the aperiodic SRS transmission, fourth information associated with a periodicity and an offset, and fifth information indicating a time domain orthogonal cover code (OCC) for the terminal;

transmitting, to the terminal on a physical downlink control channel (PDCCH), downlink control information (DCI); and receiving, from the terminal, an aperiodic SRS in a subframe identified based on the DCI and the second information, the aperiodic SRS being received in the subframe based on the first information, the second information, the fourth information, and the fifth information, and on a band based on the third information, wherein the aperiodic SRS is mapped on at least one resource element identified based on the first information in the subframe, and wherein a first hopping pattern is applied to at least one symbol other than the additional symbols in the subframe, and a second hopping pattern which is different from the first hopping pattern is applied to additional symbols.

4. The method of claim 3, wherein at least one bit included in the DCI indicates a parameter set for the aperiodic SRS from at least one parameter set configured by the RRC message.

5. A terminal in a wireless communication system supporting a time division duplex (TDD), the terminal comprising:

a transceiver configured to transmit and receive a signal; and a controller configured to:
receive, from a base station, a radio resource control (RRC) message configuring an aperiodic sounding reference signal (SRS) transmission with extended uplink pilot time slot (UpPTS), the RRC message including first information associated with a transmission comb among 4 combs for the aperiodic SRS transmission, second information associated with a number of additional symbols in the extended UpPTS for the aperiodic SRS transmission, third information associated with a bandwidth for the aperiodic SRS transmission, fourth information associated with a periodicity and an offset, and fifth information indicating a time domain orthogonal cover code (OCC) for the terminal, receive, from the base station on a physical downlink control channel (PDCCH), downlink control information (DCI), identify a subframe for transmitting an aperiodic SRS based on the DCI and the second information, identify at least one resource element in the subframe based on the first information, map the aperiodic SRS on the at least one resource element in the subframe, and transmit, to the base station, the aperiodic SRS in the subframe based on the first information, the second information, the fourth information, and the fifth information, and on a band based on the third information, wherein a first hopping pattern is applied to at least one symbol other than the additional symbols in the subframe, and a second hopping pattern which is different from the first hopping pattern is applied to additional symbols.

6. The terminal of claim 5, wherein at least one bit included in the DCI indicates a parameter set for the aperiodic SRS from at least one parameter set configured by the RRC message.

7. A base station in a wireless communication system supporting a time division duplex (TDD), the base station comprising:

a transceiver configured to transmit and receive a signal; and a controller configured to:
transmit, to a terminal, a radio resource control (RRC) message configuring an aperiodic sounding reference signal (SRS) transmission with extended uplink pilot time slot (UpPTS), the RRC message including first information associated with a transmission comb among 4 combs for the aperiodic SRS transmission, second information associated with a number of additional symbols in the extended UpPTS for the aperiodic SRS transmission, third information associated with a bandwidth for the aperiodic SRS transmission, fourth information associated with a periodicity and an offset, and fifth information indicating a time domain orthogonal cover code (OCC) for the terminal, transmit, to the terminal on a physical downlink control channel (PDCCH), downlink control information (DCI), and receive, from the terminal, an aperiodic SRS in a subframe identified based on the DCI and the second information, the aperiodic SRS being received in the subframe based on the first information, the second information, the fourth information, and the fifth information, and on a band based on the third information, wherein the aperiodic SRS is mapped on at least one resource element identified based on the first information in the subframe, and wherein a first hopping pattern is applied to at least one symbol other than the additional symbols in the subframe, and a second hopping pattern which is different from the first hopping pattern is applied to additional symbols.

8. The base station of claim 7, wherein at least one bit included in the DCI indicates a parameter set for the aperiodic SRS from at least one parameter set configured by the RRC message.

* * * * *